(12) United States Patent
Rejeti et al.

(10) Patent No.: US 12,180,876 B2
(45) Date of Patent: Dec. 31, 2024

(54) SYSTEMS AND METHODS FOR DIAGNOSING STUCK ATWU VALVE

(71) Applicant: Ford Global Technologies, LLC, Dearborn, MI (US)

(72) Inventors: Sitaram Rejeti, Canton, MI (US); Adam Krach, Canton, MI (US); Vaibhav Khanna, Dearborn, MI (US); Luis Juarez, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/182,965

(22) Filed: Mar. 13, 2023

(65) Prior Publication Data

US 2024/0309798 A1    Sep. 19, 2024

(51) Int. Cl.
| | |
|---|---|
| *F01P 11/06* | (2006.01) |
| *F01P 7/16* | (2006.01) |
| *F01P 11/16* | (2006.01) |
| *F01P 7/14* | (2006.01) |

(52) U.S. Cl.
CPC ............ *F01P 11/16* (2013.01); *F01P 7/165* (2013.01); *F01P 2007/146* (2013.01); *F01P 2025/32* (2013.01); *F01P 2025/40* (2013.01); *F01P 2037/02* (2013.01); *F01P 2060/045* (2013.01)

(58) Field of Classification Search
CPC ......... B60Y 2306/15; F01P 7/14; F01P 7/165; F01P 11/16; F01P 2031/32; F01P 11/08; F01P 2060/045; F02D 41/06; F02D 41/221
See application file for complete search history.

(56) References Cited

U.S. PATENT DOCUMENTS

| | | | |
|---|---|---|---|
| 8,683,854 B2 | 4/2014 | Pursifull et al. | |
| 9,022,647 B2 | 5/2015 | Jentz et al. | |
| 2013/0255603 A1* | 10/2013 | Pursifull | F01P 11/16 |
| | | | 123/41.15 |
| 2017/0314669 A1 | 11/2017 | Paris et al. | |
| 2018/0087450 A1 | 3/2018 | Karnik et al. | |
| 2018/0119597 A1 | 5/2018 | Styron | |

FOREIGN PATENT DOCUMENTS

| | | | | |
|---|---|---|---|---|
| CN | 108884793 A | * | 11/2018 | ............. F02D 41/18 |
| JP | 2012189162 A | * | 10/2012 | |
| KR | 100780377 B1 | * | 11/2007 | |

* cited by examiner

*Primary Examiner* — George C Jin
*Assistant Examiner* — Teuta B Holbrook
(74) *Attorney, Agent, or Firm* — Vincent Mastrogiacomo; McCoy Russell LLP

(57) ABSTRACT

Methods and systems are provided for diagnosing a stuck Active Transmission Warmup (ATWU) valve. In one example, a method for an ATWU valve monitoring routine of a vehicle comprises determining a temperature difference between an engine coolant temperature (ECT) and a transmission fluid temperature (TFT) over a duration before the ATWU valve is commanded from a closed position to an open position or from the open position to the closed position comparing a rate of change of the TFT before and after the ATWU valve is commanded to the open position or the closed position; and indicating a stuck ATWU valve based on at least one of the temperature difference, the TFT rate of change comparison, or a combination thereof, based on a calibration parameter.

18 Claims, 11 Drawing Sheets

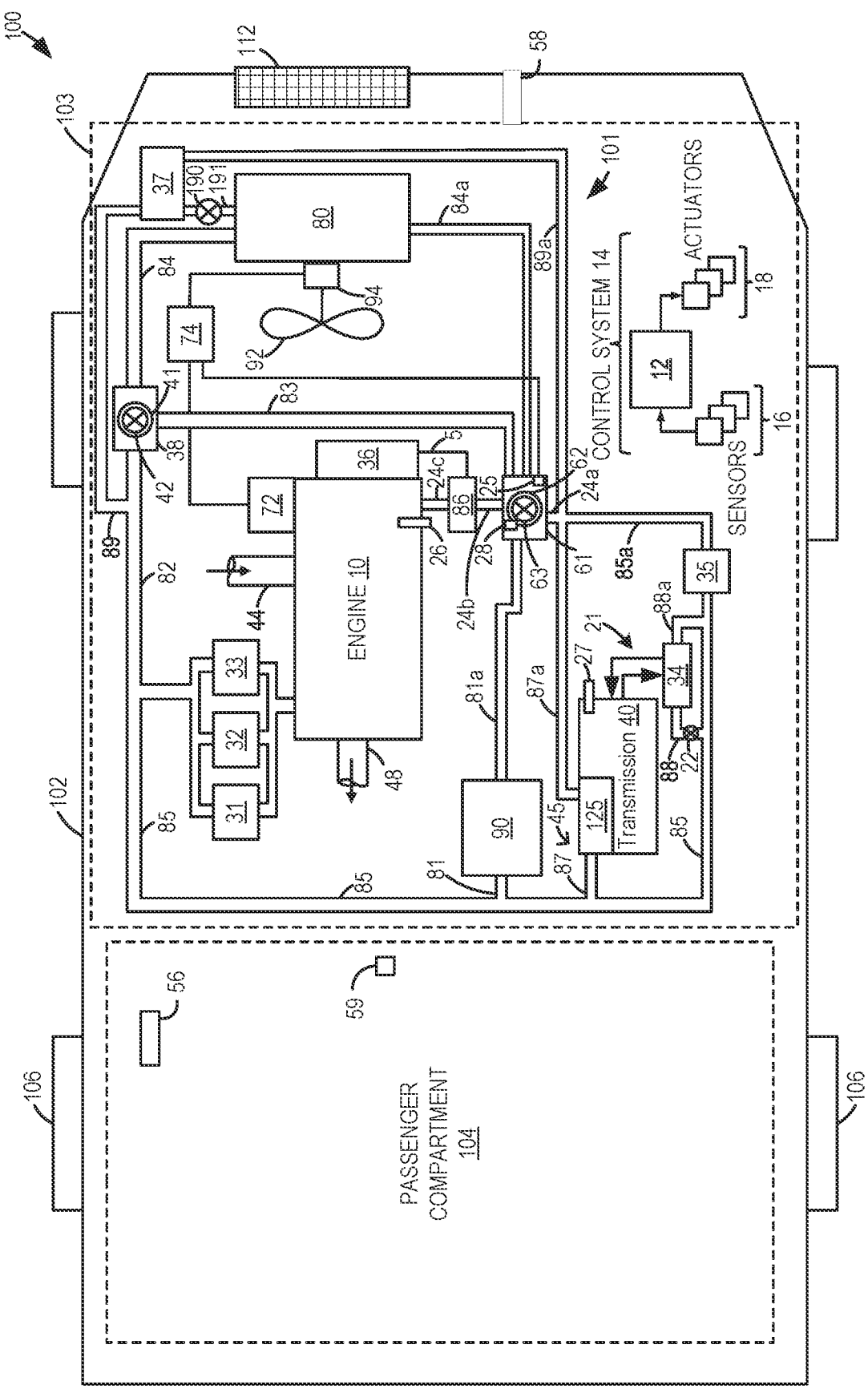

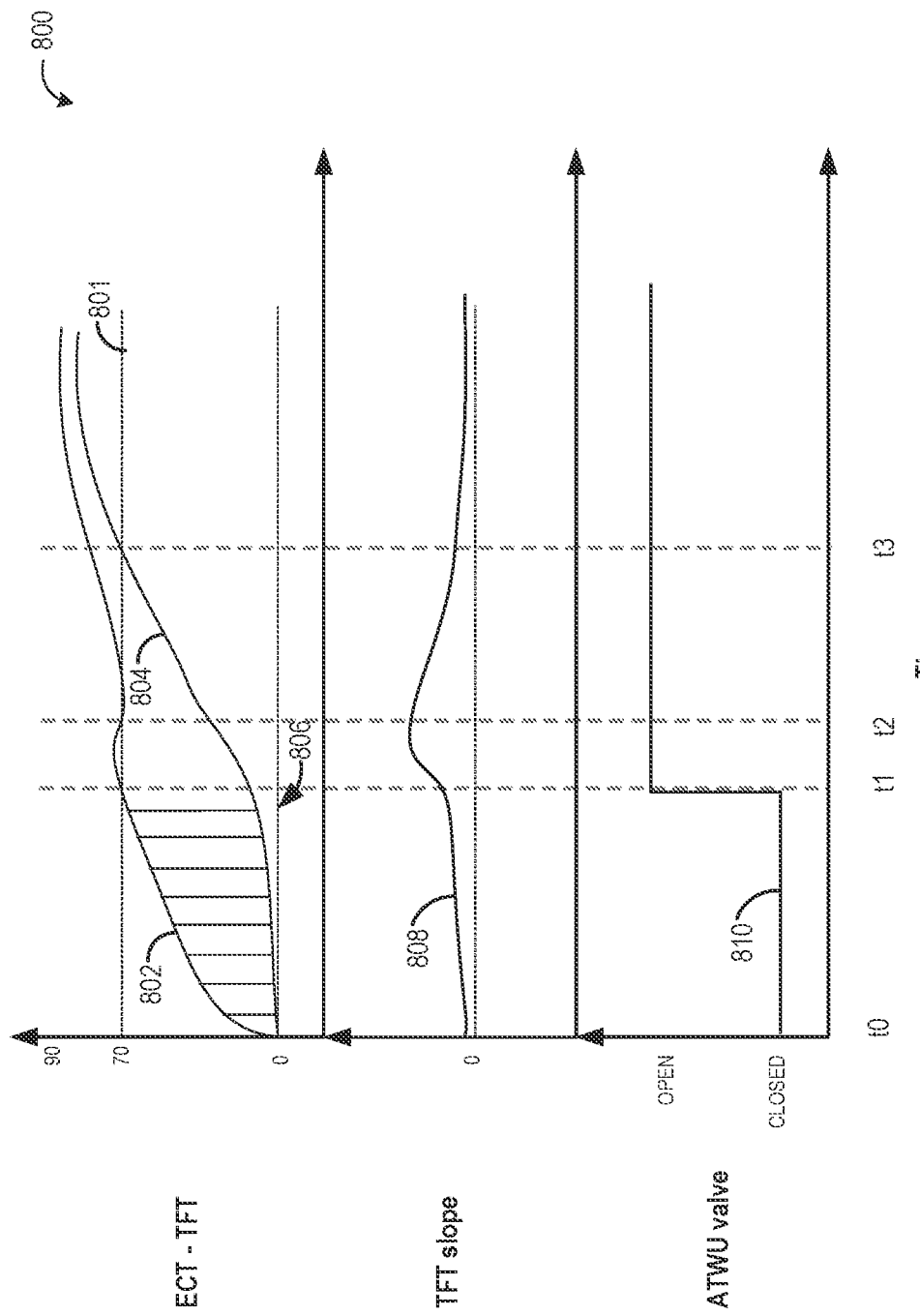

SYSTEMS AND METHODS FOR DIAGNOSING STUCK ATWU VALVE

FIELD

The present description relates generally to methods and systems for diagnosing a stuck Active Transmission Warmup (ATWU) valve of a vehicle.

BACKGROUND/SUMMARY

Vehicles may include cooling systems configured to reduce overheating of an engine by transferring the heat to ambient air. Therein, coolant is circulated through the engine block to remove heat from the hot engine, and the heated coolant is then circulated through a radiator near the front of the vehicle. Heated coolant may also be circulated through a heat exchanger to heat a passenger compartment. The cooling system may include various components such as various valves and one or more thermostats.

While vehicles may include cooling systems to reduce overheating of the engine, it may additionally be understood that various vehicle systems tend to operate most efficiently when in an optimal temperature range. For example, operating a transmission of a vehicle above a threshold temperature may present durability complications, while operating the transmission below the threshold temperature may result in degraded efficiency. To help maintain the transmission within a desired temperature range, the vehicle may include an Active Transmission Warmup (ATWU) valve, which may be opened to expand an engine coolant loop to divert warm engine coolant to the transmission. The ATWU valve may be actuated in accordance with a control strategy that ensures that heat is directed efficiently and in a balanced manner throughout the coolant loop, to warm the engine, the transmission, a cabin of the vehicle, and/or other vehicle components.

Under some circumstances, the ATWU valve may become stuck in either a closed position or an open position, reducing an efficiency of the transmission, engine, and/or the vehicle. If a stuck ATWU valve can be detected, it may be desirable to adjust one or more operating conditions of the engine and/or vehicle to maintain the efficiency of the transmission, engine, and or vehicle and reduce degradation. For example, an acceleration of the vehicle may be limited if the ATWU valve is stuck.

In various examples, the ATWU valve may be diagnosed as being stuck. For example, U.S. Pat. No. 8,683,854B2 to Pursifull et al. teaches diagnosing a stuck ATWU valve by comparing a first temperature of coolant flowing in a first loop including the transmission with a second temperature of coolant flowing in a second loop not including the transmission. If after a duration following actuation of the ATWU valve, the first temperature exceeds a threshold temperature, a stuck ATWU valve may be indicated. Further, U.S. Pat. No. 9,022,647B2 to Jentz et al. teaches increasing an accuracy of ATWU valve diagnoses by comparing temperatures of coolant at different portions of a coolant loop based on states of different valves of the coolant loop.

However, the inventors herein have recognized potential issues with such an approach. Specifically, the methods may not be sufficient to indicate a stuck ATWU valve during a cold start, which may reduce an efficiency of engine warmup and increase an amount of time taken for the engine to reach optimal operating conditions. As a result, an opportunity exists for developing more robust diagnostics for monitoring and diagnosing a stuck ATWU valve.

The inventors herein have recognized these issues, and have developed systems and methods to at least partially address the above issues. In one example, a method for an ATWU valve monitoring routine of a vehicle comprises, determining a temperature difference between an engine coolant temperature (ECT) and a transmission fluid temperature (TFT) over a duration before the ATWU valve is commanded from an open position to a closed position or from the closed position to the open position; comparing a rate of change of the TFT before and after the ATWU valve is commanded to the open position or the closed position; and indicating a stuck ATWU valve based on at least one of the temperature difference, the TFT rate of change comparison, or a combination thereof, based on a calibration parameter. For example, a vehicle engine may be started in cold weather. When the engine is started, engine coolant may begin to circulate through a coolant loop of the vehicle. The engine coolant may be routed to a heat exchanger, where heat from the engine absorbed by the engine coolant is transferred to air that is blown into a cabin of the vehicle to warm occupants of the vehicle. When the engine coolant reaches a threshold temperature, an ATWU valve positioned on the coolant loop may be actuated to an open position. When the ATWU valve is actuated to the open position, the engine coolant may be routed to a second heat exchanger, where heat from the engine coolant may be transferred to transmission fluid circulating through a transmission of the vehicle. In this way, the transmission fluid may more rapidly reach an optimal TFT for the functioning of the transmission, increasing an efficiency of the vehicle. However, when the ATWU valve is actuated to the open position, if the ATWU valve does not open and remains stuck in the closed position, heat from the engine coolant may not be transferred to the transmission fluid, whereby the optimal TFT may not be achieved.

A valve monitoring routine may be regularly performed to diagnose the stuck ATWU valve. The valve monitoring routine may include the first algorithm (referred to herein as the ECT/TFT delta algorithm) and the second algorithm (referred to herein as the TFT slope delta algorithm). When the valve monitoring routine performs the first algorithm, a temperature 5 difference between the ECT and the TFT is measured before the ATWU valve is commanded open, where the temperature difference is determined by comparing an area integral between an ECT curve and a TFT curve. If an expected decrease in the temperature difference is detected, it may be inferred that heat is being transferred to the transmission fluid, whereby the first algorithm may indicate that the ATWU valve is open (e.g., stuck in open position). If the expected decrease in temperature difference is not detected, it may be inferred that heat is not being transferred to the transmission fluid, whereby the first algorithm may indicate that the ATWU valve is closed (e.g., operating as expected).

When the valve monitoring routine performs the second algorithm, a rate of change of the TFT measurements (e.g., a slope of a curve defined by the TFT measurements) is calculated over a first duration prior to opening the ATWU valve, and over a second, equal duration after opening the ATWU valve. If a difference between a first TFT slope prior to opening the ATWU valve and a second TFT slope after opening the ATWU valve (e.g., the TFT slope delta) exceeds a threshold value, it may be inferred that additional heat is being transferred to the transmission fluid after the valve is commanded open, whereby the second algorithm may indicate that the ATWU valve is open (e.g., operating as expected). If the TFT slope delta does not exceed the threshold value, it may be inferred that no additional heat is being transferred to the transmission fluid after the valve is commanded open, whereby the second algorithm may indicate that the ATWU valve is stuck (e.g., stuck in a closed position or open position). The valve monitoring routine may diagnose a stuck ATWU valve based on either or both of the first (ECT/TFT delta) algorithm and the second (TFT slope delta) algorithm, based on a calibration parameter of the valve monitoring routine. In this way, a procedure is provided for diagnosing the stuck ATWU valve that may be more robust than current approaches. An additional advantage of the systems and methods described herein is that the procedure may be implemented in a controller of the vehicle, and may rely on already existing sensors and other components of the vehicle, whereby a cost of implementation may not be high.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1A schematically shows an example vehicle cooling/warming system configured to warm transmission fluid during a cold start.

FIG. 8A shows a first example timeline for performing the monitoring routine of FIG. 2 during an engine startup event, in a first condition where the ATWU valve is not stuck.

DETAILED DESCRIPTION

Figure 1B:
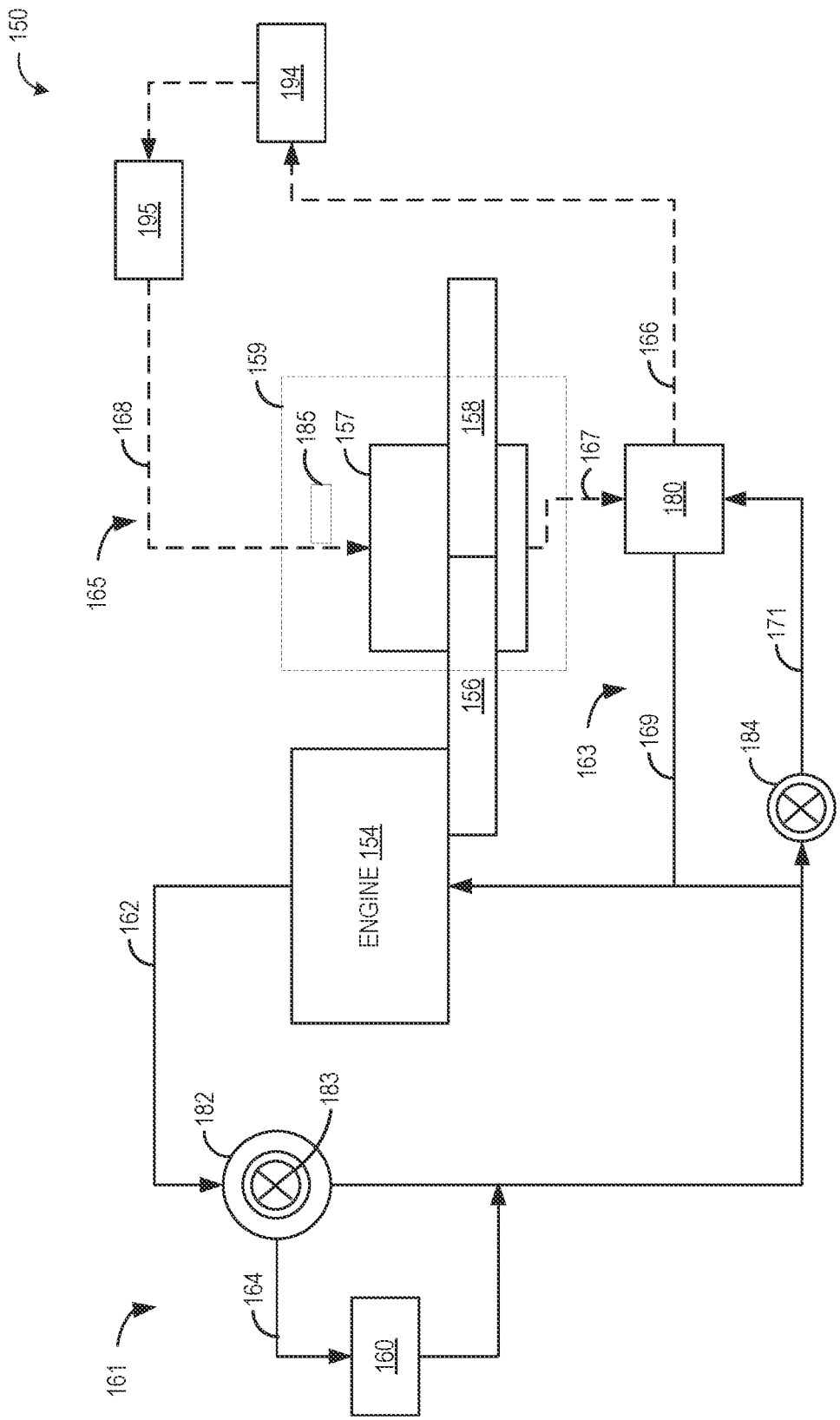
FIG. 1B shows a simplified example warming system for a transmission including an ATWU valve.
Figure 2:
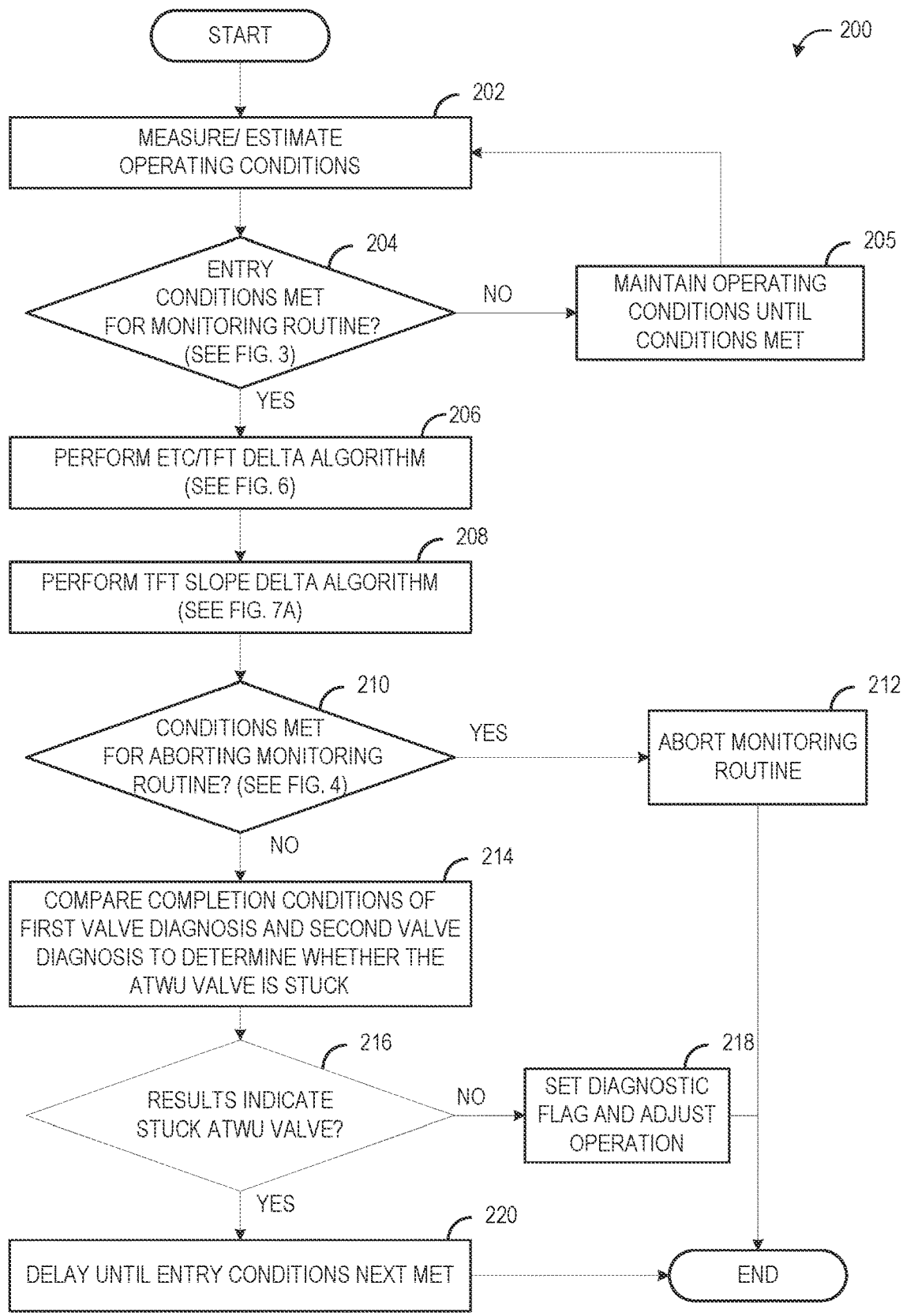
FIG. 2 shows a high-level flowchart illustrating an example method for a monitoring routine performed during an engine startup event, according the system of FIGS. 1A and 1B.
Figure 3:
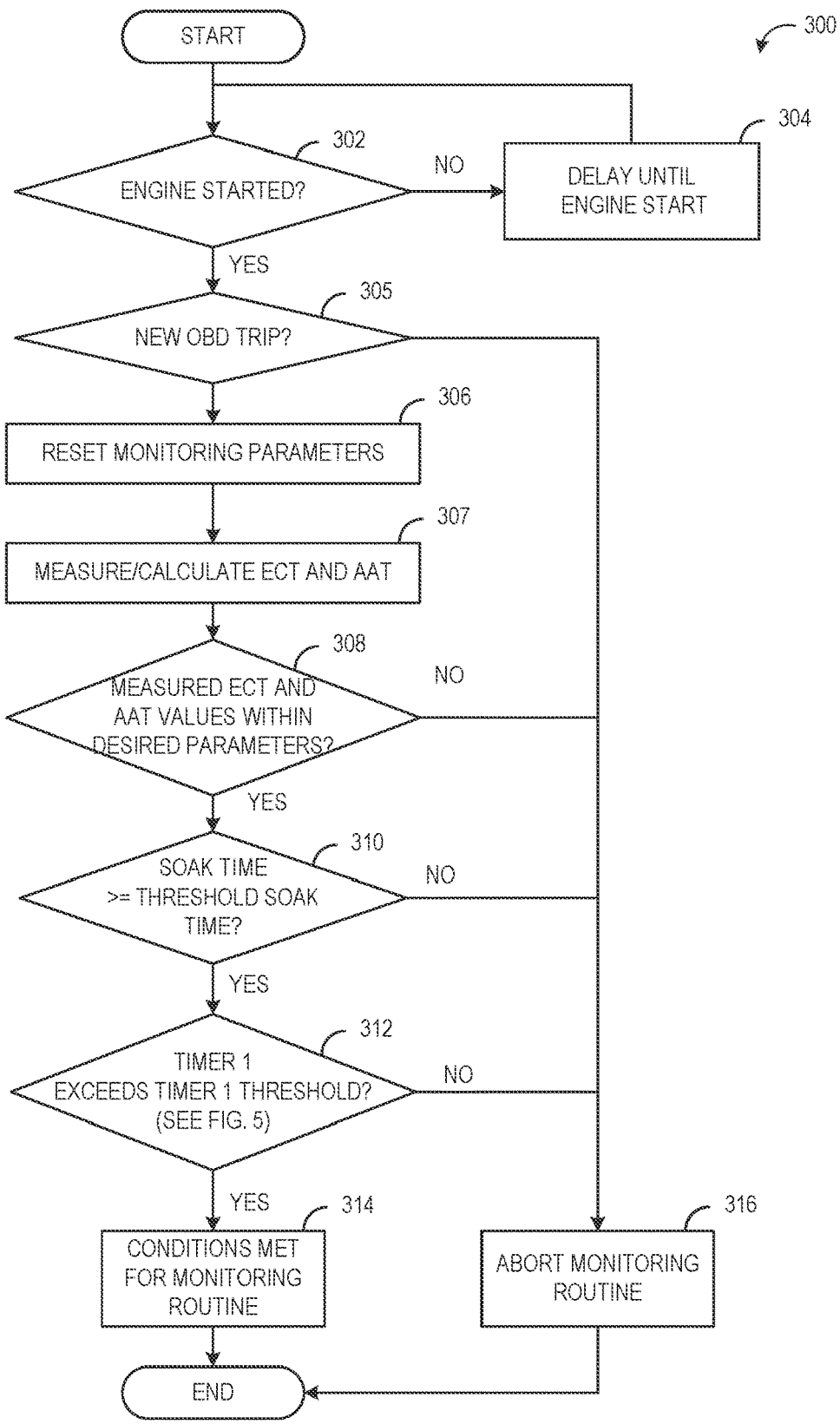
FIG. 3 shows a flowchart illustrating an example method for determining whether conditions are met to perform the monitoring routine of FIG. 2.
Figure 4:
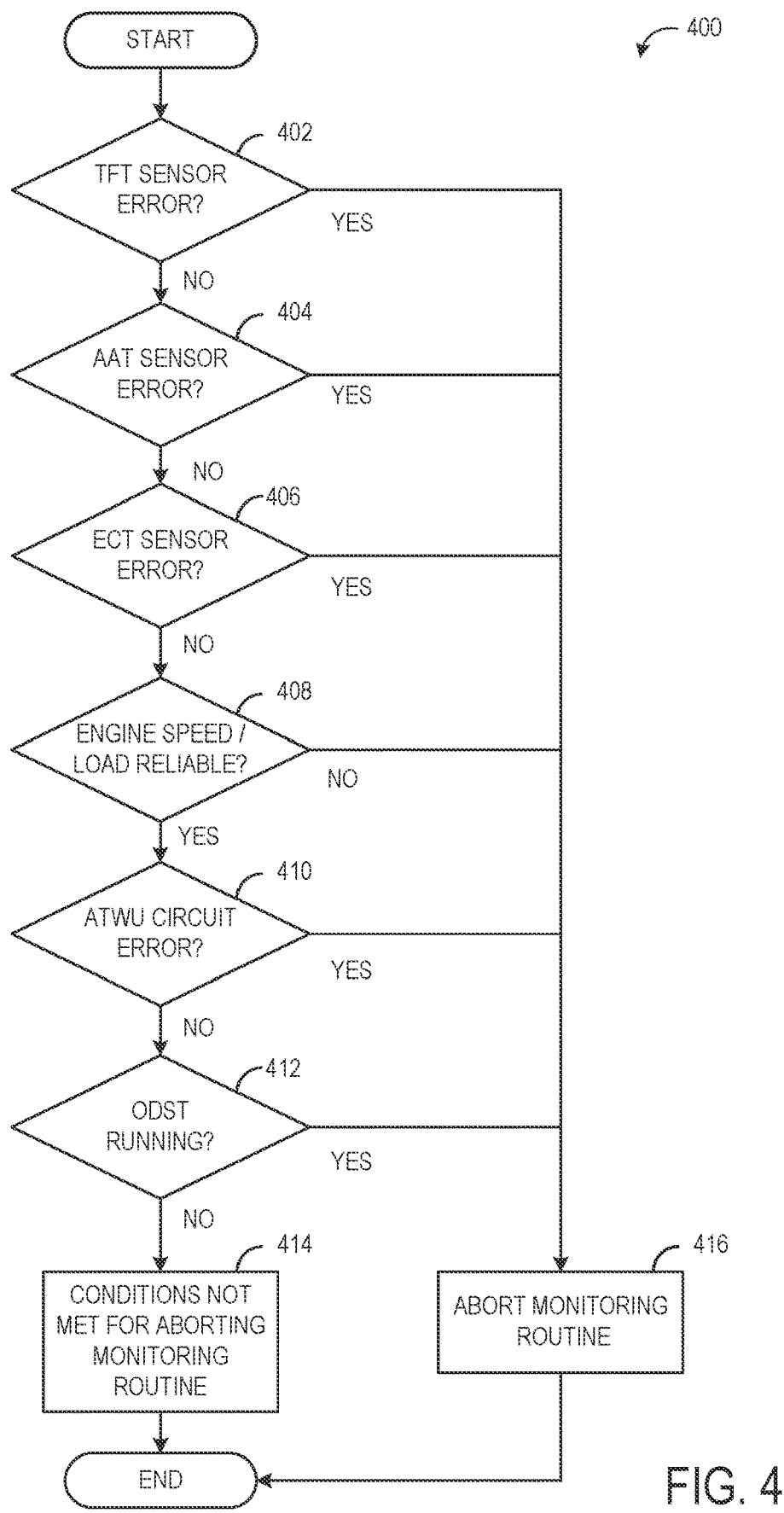
FIG. 4 shows a flowchart illustrating an example method for determining whether conditions are met to abort the monitoring routine of FIG. 2.
Figure 5:
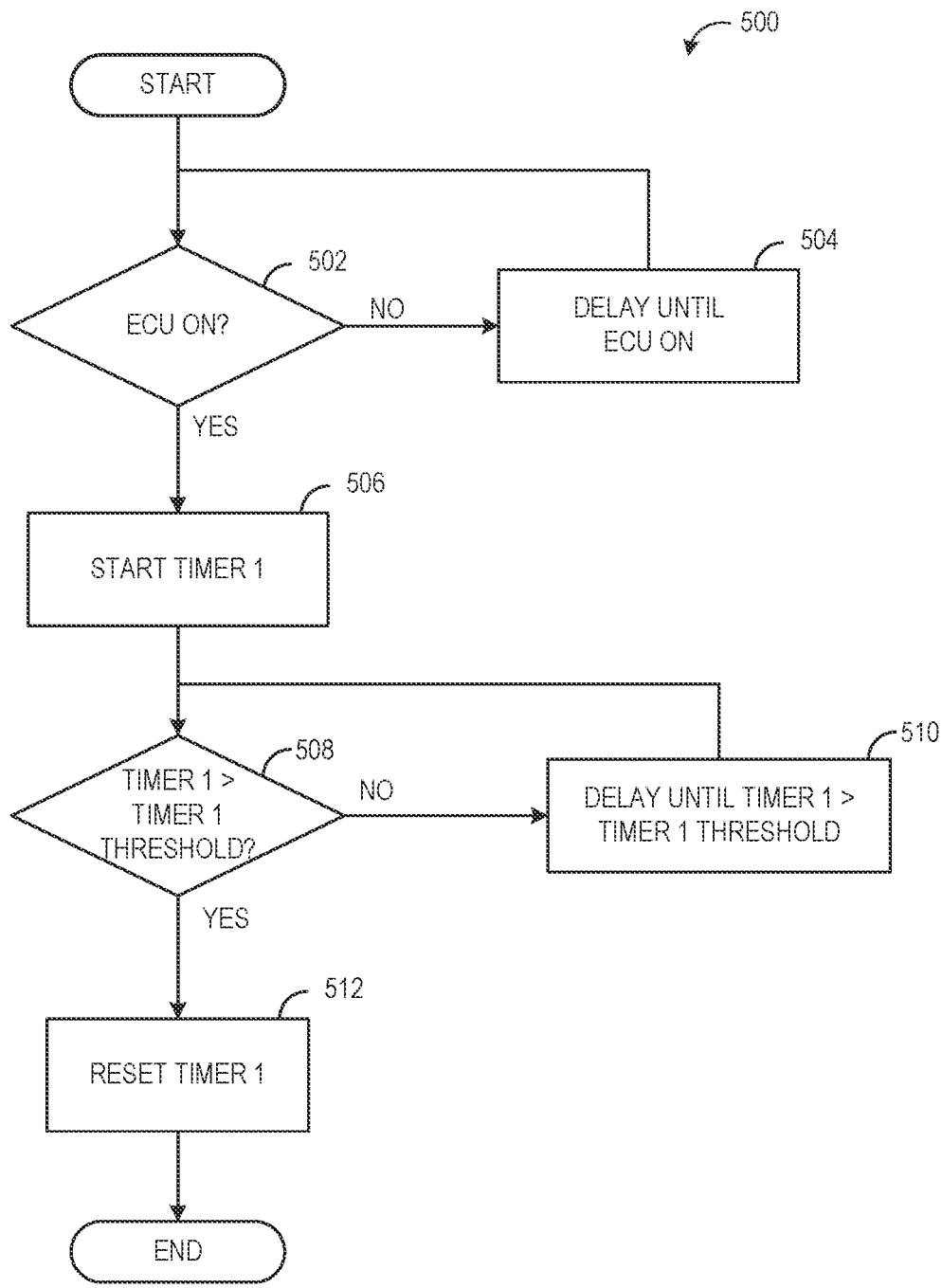
FIG. 5 shows a flowchart illustrating an example method for determining whether a threshold value is achieved by a timer used in the monitoring routine of FIG. 2.
Figure 6:
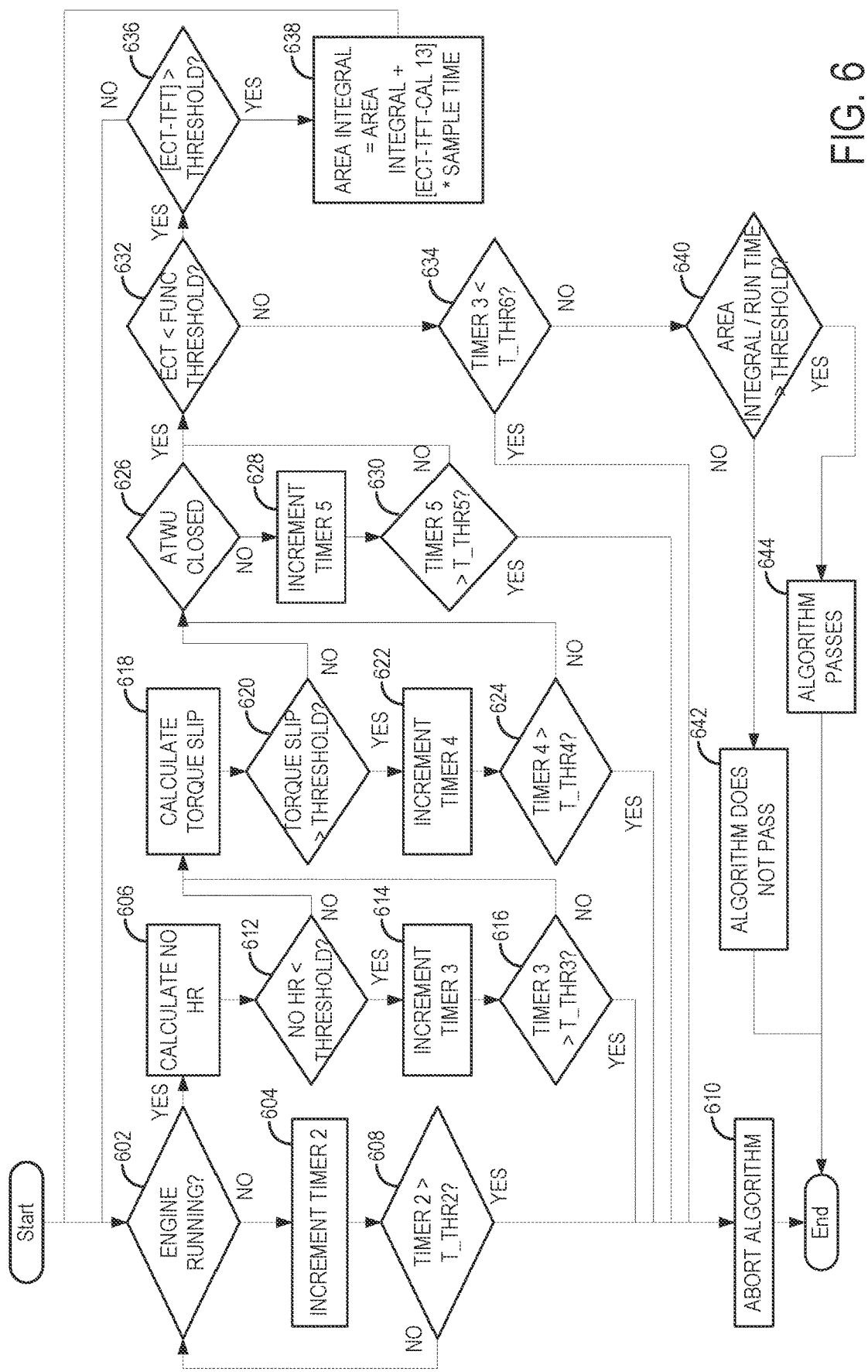
FIG. 6 shows a flowchart illustrating a first example method for determining whether the ATWU valve is stuck, as part of the monitoring routine of FIG. 2.

The following description relates to systems and methods for diagnosing a stuck Active Transmission Warmup (ATWU) valve of a vehicle cooling system, such as the vehicle cooling system depicted in FIG. 1A. The vehicle cooling system may include a transmission warming system, as depicted in FIG. 1B. The stuck ATWU valve may be diagnosed by performing a monitoring routine described in reference to FIGS. 2-7B. Specifically, FIG. 2 shows a high-level method followed by the monitoring routine, where FIGS. 3 and 4 show methods for determining whether conditions are met for running the monitoring routine and aborting the monitoring routine, respectively. Determining whether the conditions are met for running the monitoring routine may rely on a timer achieving a threshold value, as depicted in the method of FIG. 5. A first method for diagnosing the stuck ATWU valve depicted in FIG. 6 is based on determining a difference in temperatures of an engine cooling system of the vehicle and a transmission cooling system of the vehicle when the ATWU valve is closed after a cold start. A second method for diagnosing the stuck ATWU valve depicted in FIGS. 7A and 7B indicates the stuck ATWU valve based on a change in an average slope of a transmission fluid temperature (TFT) prior to and after opening the ATWU valve during the cold start. In various embodiments, the monitoring routine may rely on a result of the first method matching a result of the second method. Example timelines for performing the monitoring routine when the ATWU valve is operating as expected and stuck closed are shown in FIGS. 8A and 8B, respectively.

FIG. 1A shows an example embodiment of a vehicle system 100 including a vehicle cooling system 101 in a motor vehicle 102. Vehicle 102 has drive wheels 106, a passenger compartment 104 (herein also referred to as a passenger cabin), and an under-hood compartment 103. Under-hood compartment 103 may house various under-hood components under the hood (not shown) of motor vehicle 102. For example, under-hood compartment 103 may house internal combustion engine 10. Internal combustion engine 10 has a combustion chamber which may receive intake air via intake passage 44 and may exhaust combustion gases via exhaust passage 48. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

Under-hood compartment 103 may further include cooling system 101, which may circulate coolant through internal combustion engine 10 to absorb waste heat, and may distribute the heated coolant to radiator 80, heater core 90, exhaust gas recirculation (EGR) cooler 31, turbo center housing 32, urea injector 33, transmission oil cooler 125, automatic transmission warm-up (ATWU) heat exchanger 34, engine oil cooler 35, and coolant degas bottle 37. In one example, cooling system 101 may be coupled to engine 10 and may circulate engine coolant from engine 10 to the various components described above via engine-driven water pump 86, and back to engine 10 via various coolant lines. An engine coolant temperature (ECT) sensor 26 may be coupled to engine 10, and may be configured to measure the temperature of engine coolant. Readings from ECT sensor 26 may then be communicated to an engine controller 12. Engine-driven water pump 86 may be coupled to the engine via front end accessory drive (FEAD) 36, and rotated proportionally to engine speed via a belt, chain, etc. (illustrated by line 5). Specifically, engine-driven pump 86 may circulate coolant through passages in the engine block, head, etc., to absorb engine heat, which is then transferred via the radiator 80 to ambient air. In one example, where pump 86 is a centrifugal pump, the pressure (and resulting flow) produced by the pump may be increased with increasing crankshaft speed, which in the example of FIG. 1A, may be directly linked to the engine speed. As will be discussed in further detail below, coolant may be selectively circulated to the various components based on vehicle operating conditions and coolant temperature.

The temperature of the coolant, and coolant flow path(s) may be regulated at least in part by a first thermostat 38. First thermostat 38 may include a temperature sensing element 41, such as a wax element, for example. Further, first thermostat 38 may include a first thermostat valve 42 located at a junction between coolant lines 82, 83, and 84. Based on a temperature of the coolant as sensed by the temperature sensing element 41, first thermostat valve 42 may be in one of three positions. For example, in a first position, first thermostat valve 42 may enable coolant to flow from coolant line 82, into coolant line 83 (also referred to herein as bypass line 83), while preventing coolant flowing from coolant line 82 to coolant line 84. In a second position, first thermostat valve 42 may enable coolant to flow from coolant line 82 into both bypass line 83 and coolant line 84. Thus, in the second position, coolant may be enabled to flow through the bypass line 83 in addition to enabling coolant to flow to the radiator 80. In a third position, first thermostat valve 42 may enable coolant to flow from coolant line 82 to coolant line 84, while preventing coolant flowing into bypass line 83.

One or more blowers (not shown) and cooling fans may be included in cooling system 101 to provide airflow assistance and augment a cooling airflow through the under-hood components. For example, cooling fan 92, coupled to radiator 80, may be operated to provide cooling airflow assistance through radiator 80. Cooling fan 92 may draw a cooling airflow into under-hood compartment 103 through an opening in the front-end of vehicle 102, for example, through grill shutter system 112. Such a cooling air flow may then be utilized by radiator 80 and other under-hood components (e.g., fuel system components, batteries, etc.) to keep the engine and/or transmission cool. Further, the air flow may be used to reject heat from a vehicle air conditioning system. Further still, the airflow may be used to increase the performance of a turbocharged/supercharged engine that is equipped with intercoolers that reduce the temperature of the air that goes into the intake manifold/engine. In one example, grill shutter system 112 may be configured with a plurality of louvers (or fins, blades, or shutters) wherein a controller may adjust a position of the louvers to control an airflow through the grill shutter system.

Cooling fan 92 may be coupled to, and driven by, engine 10, via alternator 72 and system battery 74. Cooling fan 92 may also be mechanically coupled to engine 10 via an optional clutch (not shown). During engine operation, the engine-generated torque may be transmitted to alternator 72 along a drive shaft (not shown). The generated torque may be used by alternator 72 to generate electrical power, which may be stored in an electrical energy storage device, such as system battery 74. Battery 74 may then be used to operate an electric cooling fan motor 94.

Vehicle system 100 may further include a transmission 40 for transmitting the power generated at engine 10 to vehicle wheels 106. Transmission 40, including various gears and clutches, may be configured to reduce the high rotational speed of the engine to a lower rotational speed of the wheel, while increasing torque in the process. To enable temperature regulation of the various transmission components, cooling system 101 may also be communicatively coupled to a transmission cooling system 45. The transmission cooling system 45 includes a transmission oil cooler 125 (or oil-to-water transmission heat exchanger) located internal or integral to the transmission 40, for example, in the transmission sump area at a location below and/or offset from the transmission rotating elements. Transmission oil cooler 125 may have a plurality of plate or fin members for maximum heat transfer purposes. Coolant from coolant line 85 may communicate with transmission oil cooler 125 via conduit 87. In some examples, a transmission fluid temperature (TFT) sensor 27 may be coupled to transmission 40, and may be configured to monitor temperature of transmission fluid, and communicate the temperature of the transmission fluid to controller 12. In some examples, coolant may flow from the radiator to the transmission oil cooler (not shown).

In some examples, coolant may flow through coolant line 85 to heater core 90 via conduit 81, where the heat may be transferred to passenger compartment 104. Specifically, heater core 90, which may be configured as a water-to-air heat exchanger, may exchange heat with the circulating coolant and transfer the heat to the vehicle passenger compartment 104 based on operator heating demands. As such, heater core may also be coupled to a vehicle HVAC system (or heating, ventilation, and air conditioning system) that includes other components such as a heater fan, and an air conditioner (not shown).

In some examples, coolant may flow through coolant line 85 to engine oil cooler 35. Engine oil cooler 35 may comprise a heat exchanger, in some examples. For example, engine oil may be fed to the engine oil cooler such that the engine oil flows through tubes of the engine oil cooler, while engine coolant flows around the tubes. As such, heat from the oil may be transferred through the walls of the tubes to the surrounding coolant.

In some examples, coolant may flow through coolant line 82, and to coolant degas bottle 37, via conduit 89. Degas bottle 37 may allow entrained air and gasses in the coolant to be separated from the coolant as the coolant flows through the degas tank. In some examples there may be a vent line 191 from radiator 80 to degas bottle 37. A vent line check valve 190 may be included in vent line 191 in some examples, to prevent air from being pulled into radiator 80. However, in other examples, vent line 191 and vent line check valve 190 may not be included in cooling system 101. FIG. 1A further shows a control system 14. Control system 14 may be communicatively coupled to various components of engine 10 to carry out the control routines and actions described herein. For example, as shown in FIG. 1A, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, vehicle acceleration, vehicle attitude, engine speed, mass airflow through the engine, ambient temperature, intake air temperature, etc.), cooling system sensors (such as coolant temperature, transmission fluid temperature, coolant level, coolant level sensor circuit board temperature, cylinder heat temperature, fan speed, passenger compartment temperature, ambient humidity, thermostat output, etc.), and others. Further, controller 12 may communicate with various actuators 18, which may include engine actuators (such as fuel injectors, an electronically controlled intake air throttle plate, spark plugs, etc.), cooling system actuators (such as the various valves of the cooling system), and others. In some examples, the storage medium may be programmed with computer readable data representing instructions executable by the processor for performing the methods described below as well as other variants that are anticipated but not specifically listed.

Furthermore, the temperature of the coolant, and coolant flow path(s), may be regulated at least in part by a second thermostat 61. Second thermostat 61 may include a second temperature sensing element 62, such as a wax element, for example. Second thermostat 61 may further include a second thermostat valve 63, located at a junction between coolant lines 81a, 83, 84a, and 24a. As illustrated, coolant line 24a may receive coolant flow from one or more of coolant lines 87a, 85a, and 89a. Second thermostat valve 63 may be configured in various positions, to enable coolant to return to pump 86 via one or more of coolant lines 83, 84a, 81a, and 24. In some embodiments, second thermostat 61 may comprise an electrically-heated thermostat, where electricity may be provided to second thermostat 61 via an electrical energy storage device, such as system battery 74. For example, in addition to the mechanical function of the wax element, second thermostat 61 may comprise an electric heater 25. Electric heater 25 may be controlled by the vehicle controller 12, where the controller may receive information on engine speed, load, transmission fluid temperature (TFT), etc. Said another way, a data set, or "map", may be stored at the controller, which may dictate when and how heat is added to the electrically-heated thermostat to ensure optimal engine performance. A position sensor 28 may be coupled to second thermostat valve 63, such that an accurate indication of what position the valve is in can be communicated to the vehicle controller.

In some examples, coolant may flow through coolant line 85 to active transmission warm-up (ATWU) heat exchanger 34, via conduit 88. For example, it may be desirable to heat transmission oil with engine coolant to warm up the transmission oil quickly, such that the transmission pumps oil more easily as compared to when it is cold. For illustrative purposes, oil flow from the transmission 40 into and away from the Transmission heat exchanger 34, is represented by arrows 21. The Transmission heat exchanger 34 may comprise a plate-fin design, as an example. Because the Transmission heat exchanger 34 utilizes engine coolant as the heat exchange fluid, transmission fluid temperature may operate at roughly the equivalent of engine temperature. Furthermore, in some examples, an ATWU bypass valve 22 may be positioned in conduit 88, and may be regulated by a controller 12 in a control system 14. For example, Transmission heat exchanger 34 may in some examples be bypassed (e.g. bypass valve 22 commanded closed). Such examples may include conditions where hot coolant is needed for cabin heating, which may occur at cold ambient temperatures (e.g. close to zero degrees F.). At warmer ambient temperatures, the ATWU bypass valve (also referred to herein as ATWU valve) 22 may be commanded open for transmission oil warming as soon as the transmission is put into drive.

As an example of how ATWU valve 22 is used, vehicle 102 may be started when engine 10 and other components of vehicle 102 are cold, for example, after a period of time during which vehicle 102 is not in use (e.g., a cold start). When engine 10 starts, coolant may begin to circulate throughout the coolant loop described above including conduits 81, 82, 83, 84, 85, 24b, and 24c. The coolant may be heated by engine 10. As a temperature of the coolant increases, heat from the coolant may be extracted and transferred to air by heater core 90, which may be blown into passenger compartment 104 to warm occupants of vehicle 102. Additionally, ATWU valve 22 may be commanded open, allowing the heated coolant to circulate through transmission heat exchanger 34 via conduits 88 and 88a. As the heated coolant circulates through heat exchanger 34, heat is extracted from the coolant and transferred to transmission fluid circulating through transmission 40. As the transmission fluid warms up, an efficiency of the transmission increases. To achieve a balance between warming the occupants and warming the transmission fluid (and/or other components of vehicle 102), ATWU valve 22 may be actuated by controller 12 in accordance with one or more control strategies. The one or more control strategies may be based on measured temperatures at various sensors of vehicle 102, including first thermostat 38, second thermostat 61, an in-cabin temperature sensor 56, an external temperature sensor 58, and/or other sensors. A first control strategy may include commanding ATWU valve 22 open at an engine start event, and adjusting a position of ATWU valve 22 as the coolant heats up. A second control strategy may include ATWU valve 22 being closed at engine start, and commanding ATWU valve 22 open in response to a temperature of the coolant achieving a threshold temperature. Various other control strategies may additionally or alternatively be used, without departing from the scope of this disclosure.

In one example, ATWU valve 22 may comprise a normally open solenoid valve that may be actuated closed to increase coolant warmup, for example, to increase an amount of heat generated in passenger compartment 104. In such embodiments, controller 12 may send a signal to ATWU valve 22, actuating ATWU valve 22 to a closed position. Alternatively, ATWU valve 22 may comprise a normally closed solenoid valve that prioritizes coolant warmup, which may be actuated open to warm up the transmission fluid. In such embodiments, controller 12 may send a signal actuating ATWU valve 22 to the open position.

Under some circumstances, ATWU valve 22 may become stuck, either in an open position or in a closed position, which may render the control strategies ineffective. If ATWU valve 22 is stuck in an open position during the cold start, a temperature of the transmission fluid (TFT) may be equal to an engine coolant temperature (ECT), whereby the TFT and the ECT may increase at the same rate. As the TFT and the ECT increase at the same rate, the transmission fluid may overheat, reducing an efficiency of transmission 40. Additionally, an amount of heat available to heat passenger compartment 104 may be reduced, resulting in discomfort for occupants of vehicle 102. Alternatively, if ATWU valve 22 is stuck in a closed position during the cold start, the transmission fluid may not be warmed to an optimal operating temperature, or may be warmed at a slower rate, reducing an efficiency of the transmission. As a result, one or more monitoring routines may be performed to monitor ATWU valve 22 to determine whether ATWU valve 22 is stuck. If ATWU valve 22 is determined by the one or more monitoring routines to be stuck, a malfunction indicator lamp (MIL) 59 of passenger compartment 104 may be illuminated.

FIG. 1B shows a simplified cooling system 150, which may be a simplified version of cooling system 101 of FIG. 1A. Simplified cooling system 150 includes an engine 154 (e.g., engine 10 of FIG. 1A) and a transmission 159. Transmission 159 includes a torque converter 157, where torque converter 157 rotates a turbine shaft 158 based on a rotation of the crankshaft 156 of engine 154. In a first coolant loop 161, coolant is circulated through a conduit 162 and a conduit 164 to a radiator 160, which may cool the coolant heated by engine 154. First coolant loop 161 may be a simplified version of the coolant loop formed by conduits 81, 82, 83, 84, 85, and 24 of FIG. 1A. A thermostat 182 may measure a temperature of the coolant, and if the temperature of the coolant is below a threshold temperature (e.g. 80° C.) a thermostat valve 183 may be closed. More specifically, a thermostat temperature sensing element of thermostat 182 may be exposed to circulating engine coolant, and as a result of the ECT being below a threshold temperature, thermostat valve 183 may be commanded to a closed position. As a result of the ECT rising above the threshold temperature, thermostat valve 183 may transition from the closed position to an open position. When thermostat valve 183 is closed, the coolant may circulate back to engine 154 without circulating through radiator 160, to conserve the heat in the coolant and accelerate a warm-up of engine 154.

Cooling system 150 also includes a transmission coolant loop 165, where a transmission fluid is circulated by a pump 195, from a sump tank 194 to transmission 159 via a conduit 168. The transmission fluid is heated as it passes through transmission 159. The heated transmission fluid exits transmission 159 via a conduit 167 of transmission coolant loop 165, and is flowed into a transmission heat exchanger 180, prior to being routed back to sump tank 194 via a conduit 166.

First coolant loop 161 is connected to transmission coolant loop 165 via a second coolant loop 163, where a flow of coolant through a conduit 169 (e.g., conduit 88 of FIG. 1A) is controlled by an ATWU valve 184 (e.g., ATWU valve 22 of FIG. 1A). Thus, when ATWU valve 184 is closed, the coolant circulates through conduits 162 and 164 of first coolant loop 161 and does not circulate through second coolant loop 163. Alternatively, when ATWU valve 184 is commanded open, the coolant is flowed to transmission heat exchanger 180 via a conduit 171, where heat in the coolant may be transferred to the transmission fluid (e.g., to warm up transmission 159). The coolant may circulate both back to engine 154 via first coolant loop 161, and through coolant loop 163 concurrently. In this way, a position of ATWU valve 184 may be controlled to adjust an amount of heat transferred to the transmission fluid at heat exchanger 180. If a temperature of the transmission fluid (TFT) is below an optimal threshold temperature, ATWU valve 184 may be adjusted to a more open position to increase the amount of heat transferred to the transmission fluid at heat exchanger 180. The TFT may be measured at a TFT sensor 185 positioned on conduit 168. If the TFT is at or above the optimal threshold temperature, ATWU valve 184 may be adjusted to a more closed position, to decrease the amount of heat transferred to the transmission fluid at heat exchanger 180. In various embodiments, ATWU valve 184 may be closed until the engine coolant achieves a threshold temperature for optimal performance (e.g., 70° C.). After the threshold temperature is achieved, ATWU valve 184 may be opened to transfer heat from the engine coolant to the transmission fluid.

As described above, ATWU valve 184 may be actuated in accordance with a control strategy to maximize a performance and/or efficiency of various components of the vehicle. Because an efficient operation of transmission 159 (e.g., transmission 40 of FIG. 1A) may rely on ATWU valve 184 operating in an expected manner, a controller (e.g., controller 12) may monitor a performance of ATWU valve 184 to determine whether ATWU valve 184 is operating in the expected manner. Monitoring the performance of ATWU valve 184 may include performing one or more monitoring routines at regular intervals, such as the monitoring routine described below in reference to FIG. 2.

Turning now to FIG. 2, an example method 200 is shown for performing a monitoring routine to evaluate a performance of an ATWU valve of a vehicle, such as ATWU valve 22 of vehicle 102 of FIG. 1A and/or ATWU valve 184 of FIG. 1B. By performing the monitoring routine, a stuck ATWU valve may be detected, which may reduce an efficiency of an engine and/or a transmission of the vehicle during warmup after a cold start. Method 200 and other methods described herein are described with reference to the systems described herein and shown in FIGS. 1A and 1B, though it should be understood that similar methods may be applied to other systems without departing from the scope of this disclosure. Parts of method 200 may be carried out by a controller, such as controller 12 in FIG. 1A, and may be stored at the controller as executable instructions in non-transitory memory. Instructions for carrying out method 200 and the rest of the methods included herein may be executed at least in part by the controller based on instructions stored on a memory of the controller and in conjunction with signals received from sensors of the engine system, such as the sensors described above with reference to FIGS. 1A and/or 1B. The controller may employ coolant system actuators according to the methods depicted below.

Method 200 begins at 202, where method 200 includes evaluating operating conditions of the vehicle. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Evaluating the operating conditions of the vehicle may include determining whether an engine of the vehicle has been turned on and/or is operating. Evaluating the operating conditions of the vehicle may further include determining a temperature of an engine coolant and/or a transmission fluid of the vehicle at one or more locations within various coolant loops used to control a temperature of the engine coolant and/or transmission fluid.

At 204, at the 200 includes determining whether entry conditions are met for performing the monitoring routine. Determining whether conditions are met for performing the monitoring routine is described in greater detail below, in reference to FIG. 3.

If at 204 it is determined that the conditions are not met for performing the monitoring routine, but the 200 proceeds to 205. At 205, method 200 includes maintaining operating conditions until the conditions are met for performing the monitoring routine. If at 204 it is determined that the conditions are met for performing the monitoring routine, and the 200 proceeds to 206.

At 206, method 200 may include performing an ECT/TFT delta algorithm, where the ECT/TFT delta algorithm is based on comparing an ECT with a TFT during the cold start event. Performing the ECT/TFT delta algorithm is described in greater detail below in reference to FIG. 6.

At 208, method 200 may include performing a TFT slope delta algorithm, where the TFT slope delta algorithm is based on comparing a first rate of change in a slope of the TFT when the ATWU valve is closed with a second rate of change in a slope of the TFT when the ATWU valve is open.

Performing the TFT slope delta algorithm is described in greater detail below in reference to FIGS. 7A and 7B.

The performance of the ATWU valve may be assessed and a stuck ATWU valve may be diagnosed based on a result of either or both of the ECT/TFT delta algorithm and the TFT slope delta algorithm. In other words, in some embodiments, the ECT/TFT delta algorithm may be performed and the TFT slope delta algorithm may not be performed, where the performance of the ATWU valve may be assessed based on the ECT/TFT delta algorithm and not the TFT slope delta algorithm. In other embodiments, the TFT slope delta algorithm may be performed and the ECT/TFT delta algorithm may not be performed, where the performance of the ATWU valve may be assessed based on the TFT slope delta algorithm and not the ECT/TFT delta algorithm. In still other embodiments, both of the first and TFT slope delta algorithms may be performed, and the performance of the ATWU valve may be assessed based on results of both the first and TFT slope delta algorithms. For example, the performance of the ATWU valve may be assessed based on an agreement of a result of the ECT/TFT delta algorithm and a result of the TFT slope delta algorithm.

In various embodiments, a selection of either or both of the ECT/TFT delta algorithm and the TFT slope delta algorithm may be calibratable and configured prior to running the monitoring routine.

At 210, method 200 includes determining whether conditions are met for aborting the monitoring routine. It should be appreciated that conditions for aborting the monitoring routine may occur at any time during performing the monitoring routine. For example, a condition for aborting the monitoring routine may occur during performance of the ECT/TFT delta algorithm described above at step 206; a condition for aborting the monitoring routine may occur during performance of the TFT slope delta algorithm described above at step 208; or at any other time during performance of the monitoring routine. If either the ECT/TFT delta algorithm or the TFT slope delta algorithm is aborted, as described in greater detail below in reference to FIGS. 6, 7A, and 7B, the monitoring routine may be aborted. Thus, the controller may monitor the conditions for aborting the monitoring routine while the monitoring routine is running, and abort the monitoring routine when the conditions are met. The conditions for aborting the monitoring routine are described in greater detail below in reference to FIG. 4.

If at 210 is determined that conditions are met for aborting the monitoring routine, method 200 proceeds to 212. At 212, method 200 includes aborting the monitoring routine, and method 200 ends. Alternatively, if at 210 it is determined that conditions are not met for aborting the monitoring routine, method 200 proceeds to 214.

At 214, at the 200 includes comparing completion conditions of the ECT/TFT delta algorithm and completion conditions of the TFT slope delta algorithm to determine whether the ATWU valve is stuck. The ECT/TFT delta algorithm may pass if the ECT/TFT delta algorithm completes (e.g., is not aborted) without a malfunction criteria being determined. Similarly, the TFT slope delta algorithm may pass if the TFT slope delta algorithm completes (e.g., is not aborted) without a malfunction criteria being determined.

In various embodiments, the performance of the ATWU valve may be evaluated based on at least one of a first result of the ECT/TFT delta algorithm and a second result of the TFT slope delta algorithm. The result of the ECT/TFT delta algorithm may be that the ECT/TFT delta algorithm either passes or does not pass. The result of the TFT slope delta algorithm may be that the TFT slope delta algorithm either passes or does not pass. If the ECT/TFT delta algorithm passes and the TFT slope delta algorithm complete and pass, the ATWU valve may be diagnosed as operating in accordance with expectations. If either of the ECT/TFT delta algorithm and the TFT slope delta algorithm complete and do not pass, the ATWU valve may be diagnosed as stuck. In other embodiments, the ATWU valve may be diagnosed as stuck if both of the ECT/TFT delta algorithm and the TFT slope delta algorithm complete and do not pass. In still other embodiments, one of the ECT/TFT delta algorithm and the TFT slope delta algorithm may be performed, and the performance of the ATWU valve may be assessed and a stuck ATWU valve may be diagnosed based on a completion/passage of the performed algorithm.

The ECT/TFT delta algorithm may not complete if the ECT/TFT delta algorithm is aborted for any reason. The TFT slope delta algorithm may not complete if the TFT slope delta algorithm is aborted for any reason. Because either algorithm may be aborted for a variety of reasons, an advantage of relying on two algorithms is that the stuck ATWU valve may be diagnosed even if one of the ECT/TFT delta algorithm and the TFT slope delta algorithm is aborted.

For example, the ECT/TFT delta algorithm may complete, and the TFT slope delta algorithm may not complete. If the completed ECT/TFT delta algorithm does not pass, the stuck ATWU valve may be diagnosed. Alternatively, the TFT slope delta algorithm may complete, and the ECT/TFT delta algorithm may not complete. If the completed TFT slope delta algorithm does not pass, the stuck ATWU valve may be diagnosed. If neither of the ECT/TFT delta algorithm and the TFT slope delta algorithm completes, insufficient data may be present to assess the performance of the ATWU valve. If both of the ECT/TFT delta algorithm and the TFT slope delta algorithm complete and pass, the ATWU valve may be operating as expected (e.g., not stuck).

At 216, method 200 includes determining whether a result of either or both of the ECT/TFT delta algorithm and the TFT slope delta algorithm indicate a stuck ATWU valve. If at 216 it is determined that a stuck ATWU valve is indicated, method 200 proceeds to 218. At 218, method 200 includes setting a diagnostic flag indicating the stuck ATWU valve. Additionally, an operation of the vehicle may be adjusted, for example, to reduce an amount of degradation of components of the vehicle and/or maintain an efficiency of the vehicle. In one embodiment, an acceleration of the vehicle is limited. A malfunction indicator lamp (MIL) of the vehicle may also be illuminated, and method 200 ends. Alternatively, if at 216 it is determined that a stuck ATWU valve is not indicated, and the performance of the ATWU valve is assessed as operating in accordance with expectations, method 200 proceeds to 220. At 220, method 200 includes delaying until the conditions for a subsequent performance of the monitoring routine are met, and method 200 ends.

Turning to FIG. 3, an exemplary method 300 is shown for determining whether entry conditions are met for performing a monitoring routine to evaluate a performance of an ATWU valve of a vehicle, such as ATWU valve 22 of vehicle 102 of FIG. 1A and/or ATWU valve 184 of FIG. 1B. The monitoring routine may be the monitoring routine described above in reference to method 200. The monitoring routine may be performed when a new OBD trip is initiated. If any of the entry conditions are not met, the monitoring routine may not be performed for a remainder of an OBD drive cycle. In general, the monitoring routine may be performed after a cold engine start. A cold-start of the vehicle may include an engine start after a threshold duration of time has elapsed since the engine was last turned off, for example. If the engine has been operating within the threshold duration, the engine coolant may have warmed to a temperature above a threshold temperature. For example, an engine hot start may be performed, where engine coolant temperature is above the threshold temperature at engine start, and/or where a time since a last engine start is below a preselected time. In some embodiments, the monitoring routine may be performed during a cold start event, and may not be performed during a hot start event.

Method 300 begins at 302, where method 300 includes determining whether an engine of the vehicle (e.g., engine 10 and/or engine 154) has been started. If at 302 it is determined that the engine has not been started, method 300 proceeds to 304. At 304, method 300 includes delaying until the engine is started, and method 300 proceeds back to 302.

At 305, method 300 includes determining whether a new onboard diagnostics (OBD) trip is being performed. If a new OBD trip is not being performed, method 300 proceeds to 316. At 316, method 300 includes aborting the monitoring routine, and method 300 ends. In other words, the monitoring routine may be performed for new OBD trips, and may not be performed multiple times within a single ODB trip. If at 305 is determined that a new OBD trip is being performed, method 300 proceeds to 306.

At 306, method 300 includes resetting parameters of the monitoring routine. Parameters indicating a status of the monitoring routine may be set to values reflecting that no results are available, no checks of entry or completion conditions have been performed, and that the monitoring routine is ready to proceed subject to the entry conditions described herein. An ECT/TFT area integral and TFT slope averages (described in greater detail below) may be reset. It should be further appreciated that the parameters may be reset at other times, for example, when the monitoring routine is aborted. For example, the parameters may be reset based on operating conditions and/or anomalies or degradations detected during performing one or more monitoring routines. The parameters may also be reset in the event of a keep alive memory (KAM) reset.

At 307, method 300 includes measuring the ECT and an ambient air temperature (AAT) at a time of starting the engine. For example, the ECT may be monitored via an engine coolant temperature sensor (e.g. sensor 26 of FIG. 1A). The AAT may be measured by a temperature sensor positioned on an exterior of the vehicle (e.g. sensor 58 of FIG. 1A).

At 308, method 300 includes determining whether the measured ECT and AAT are within desired temperature parameters. The desired temperature parameters may be established by threshold temperature values. For example, if the measured AAT is greater than a first AAT threshold temperature, the monitoring routine may be performed. In one embodiment, the first AAT threshold temperature is 19.4° F., where if the ambient temperature is less than 19.4° F., the conditions may not be met for running the monitoring routine. In other embodiments, method 300 may include determining whether the measured AAT is less than a second AAT threshold temperature, where if the AAT is greater than the second AAT threshold temperature, the conditions may not be met for running the monitoring routine.

Similarly, method 300 may include determining whether the measured ECT is equal to or greater than a first ECT threshold temperature, and/or determining whether the measured ECT is less than a second ECT threshold temperature, where the first ECT threshold temperature and the second ECT threshold temperature establish an ECT range within which the monitoring routine may be performed. Because the monitoring routine relies at least partly on quantifying a difference between the ECT and the TFT, if the ECT is higher than desired at engine start, there may not be enough temperature difference generated between ECT and TFT by the time the monitoring routine completes. If the ECT is lower than desired at the engine start, the difference between the ECT and the TFT may become too high due to the substantial heat transfer between engine and ECT. In one embodiment, the first ECT threshold temperature is 19.4° F., where if ECT is less than 19.4° F., the conditions may not be met for running the monitoring routine and the second ECT threshold temperature is 95° F., where if ECT is greater than 95° F., the conditions may not be met for running the monitoring routine. In some embodiments, the ECT range may depend on the measured AAT. For example, in one embodiment, if the ECT is more than 59° F. higher than the AAT at first engine start, ECT may be heated to due to an outside source such as a block heater and the conditions may not be met for running the monitoring routine.

If at 308 it is determined that the measured ECT and the AAT are not within the desired temperature parameters, method 300 proceeds to 316. At 316, method 300 includes aborting the monitoring routine. Alternatively, if at 308 it is determined that the ECT and the AAT are within the desired temperature parameters, method 300 proceeds to 310.

At 310, method 300 includes determining whether a soak time is greater than or equal to a threshold soak time. The soak time may be a time during which heat from the engine coolant radiates to various under-hood components of the vehicle (e.g., components within hood compartment 103 of FIG. 1A) after an engine shut-off. In other words, the monitoring routine may not be performed until the heat is allowed to dissipate for a minimum amount of time, to ensure that the various under hood components are sufficiently cooled to generate cold start conditions. In one embodiment, the threshold soak time is 6 hours, where if less than 6 hours have passed since engine-off for an internal combustion engine, the conditions may not be met for running the monitoring routine. For a hybrid vehicle, the threshold soak time may refer to an amount of continuous time during which the vehicle is not in a state of "propulsion system active".

If at 310 it is determined that the soak time is not greater than or equal to the threshold soak time, method 300 proceeds to 316, and the monitoring routine is aborted. If at 310 it is determined that the soak time is greater than or equal to the threshold soak time, method 300 proceeds to 312.

At 312, method 300 includes determining whether an output of a first timer exceeds a first threshold time. In various embodiments, the monitoring routine may not be performed if the output of the first timer does not exceed the first threshold time. The first timer may be used to ensure that a minimum duration (e.g., delay) has elapsed after the engine is started prior to running the monitoring routine, to ensure that a TFT quality factor is acceptable and to avoid initialization values coming from a transmission control module of the vehicle. In various embodiments, the minimum duration may be calibratable based on test conditions. In one embodiment, the first timer may be operated as described in reference to FIG. 5.

Turning briefly to FIG. 5, a method 500 is shown for incrementing the first timer. Method 500 begins at 502, where method 500 includes determining whether an electronic control unit (ECU) of the vehicle has been switched on. The ECU of the vehicle may be included within control system 14 of FIG. 1A. If at 502 it is determined that the ECU has not been switched on, method 500 proceeds to 504. At 504, at 500 includes delaying until the ECU is switched on. Alternatively, if at 502 it is determined that the ECU has been switched on, method 500 proceeds to 506.

At 506, method 500 includes incrementing the first timer, and method 500 proceeds to 508. At 508, method 500 includes determining whether the output of the first timer exceeds the first threshold time (e.g., 20 seconds). If the output of the first timer does not exceed the first threshold time, method 500 proceeds back to 510, where a delay is imposed until the output of the first timer exceeds the first threshold time, and method 500 proceeds back to 508. Alternatively, if the output of the first timer exceeds the first threshold time, method 500 proceeds to 510. At 510, method 500 includes resetting the first timer, and method 500 ends.

Returning to method 300, at 314, method 300 includes determining that the conditions for performing the monitoring routine have been met, and method 300 ends.

Referring now to FIG. 4, an exemplary method 400 is shown for determining whether conditions are met for aborting a monitoring routine to evaluate a performance of a ATWU valve of a vehicle, as described above in reference to method 200 of FIG. 2. In various embodiments, method 400 may be performed as part of the monitoring routine of method 200 described above. Method 400 begins at 402, where method 400 includes determining whether an error is detected in a TFT sensor of the vehicle (e.g., TFT sensor 27 of FIG. 1A and/or TFT sensor 185 of FIG. 1B). If an error is detected in the TFT sensor, an accurate TFT may not be generated, whereby the monitoring routine may not return an accurate result. As such, if an error is detected in the TFT sensor, method 400 proceeds to 416. At 416, method 400 includes aborting the monitoring routine, and method 400 ends.

If at 402 an error is not detected in the TFT sensor, method 400 proceeds to 404. At 404, method 400 includes determining whether an error is detected in and AAT sensor of the vehicle (e.g., external temperature sensor 58 of FIG. 1A). If an error is detected in the AAT sensor, an accurate AAT may not be generated, whereby the monitoring routine may not return an accurate result. As such, if an error is detected in the AAT sensor, method 400 proceeds to 416. At 416, method 400 includes aborting the monitoring routine, and method 400 ends.

If at 404 an error is not detected in the AAT sensor, method 400 proceeds to 406. At 406, method 400 includes determining whether an error is detected in an ECT sensor of the vehicle (e.g., ECT sensor 26 of FIG. 1A and/or thermostat 182 of FIG. 1B). If an error is detected in the ECT sensor, an accurate ECT may not be generated, whereby the monitoring routine may not return an accurate result. As such, if an error is detected in the ECT sensor, method 400 proceeds to 416. At 416, method 400 includes aborting the monitoring routine, and method 400 ends.

If at 406 an error is not detected in the ECT sensor, method 400 proceeds to 408. At 408, method 400 includes determining whether an engine speed and/or an engine load is reliable. If at 408 an error is detected in either of an engine speed sensor and/or an engine load sensor, method 400 proceeds to 416. At 416, method 400 includes aborting the monitoring routine, and method 400 ends.

If at 408 the engine speed and engine load are determined to be reliable, method 400 proceeds to 410. At 410, method 400 includes determining whether an error is detected in an ATWU circuit of the vehicle. If an error is detected in the ATWU circuit, the monitoring routine may be able to be performed. As such, if an error is detected in the ATWU circuit, method 400 proceeds to 416. At 416, method 400 includes aborting the monitoring routine, and method 400 ends.

If at 410 an error is not detected in the ATWU circuit, method 400 proceeds to 412. At 412, method 400 includes determining whether an On Demand Self-Test routine (ODST) is running. The ODST involves checking the ATWU valve, among other sensors/actuators, for proper operation. The monitoring routine may not be performed if an On Demand test is running.

If at 412 it is determined that the ODST is running, the monitoring routine may not be performed, whereby method 400 proceeds to 416. At 416, method 400 includes aborting the monitoring routine, and method 400 ends. If at 412 it is determined that the ODST is not running, method 400 proceeds to 414.

At 414, method 400 includes indicating that conditions are not met for aborting the monitoring routine. The monitoring routine is therefore not aborted, and method 400 ends. Method 400 may continue to run in a loop until both the ECT/TFT delta algorithm and TFT slope delta algorithm have either completed or aborted.

Referring now to FIG. 6, an exemplary method 600 is shown for performing a first algorithm to diagnose a stuck ATWU open valve of a vehicle, as described above in reference to the method 200 of FIG. 2. The first algorithm may be referred to as an ECT/TFT delta algorithm. In various embodiments, method 600 may be performed as part of the ATWU valve monitoring routine of method 200 described above. Method 600 is described herein as diagnosing the ATWU valve stuck in an open position, for example, when the ATWU valve is commanded closed during the initial warm up of the engine. However, method 600 may also be performed for diagnosing the ATWU valve stuck in a closed position, with a few modifications as described below. The ATWU valve may become stuck in the closed position when the ATWU valve is commanded to the open position to warm up the transmission fluid during a cold start of an engine after ECT has exceeded the functional threshold. In other words, method 600 may be used to diagnose both the ATWU valve being stuck in the open position and the ATWU valve being stuck in the closed position, during operation of the vehicle during a single OBD trip.

Method 600 begins at 602, where method 600 includes determining whether an engine of the vehicle is running. The ECT/TFT delta algorithm may rely on the engine being continuously running for an amount of time, where if a cumulative amount of time during which the engine is stopped is greater than a threshold time, the ECT/TFT delta algorithm may be aborted.

If at 602 it is determined that the engine is not running, method 600 proceeds to 604. At 604, method 600 includes incrementing a second timer, where the second timer counts a cumulative amount time the engine has not been running while the method 600 is being performed, and method 600 proceeds to 608. At 608, method 600 includes determining whether an output of the second timer exceeds a second threshold time. In various embodiments, the second threshold time, and the other thresholds described in method 600 and in other methods of this disclosure, may be calibratable, where the thresholds are established during a system calibration and may be set between predetermined upper and lower bounds. For example, the second threshold can be set to 100 seconds. If the second timer counts to more than 100 seconds, the method 600 may not be performed.

If at 608 it is determined that the output of the second timer does not exceed the second threshold time, method 600 returns to 602. If at 608 it is determined that the output of the second timer exceeds the second threshold time, method 600 proceeds to 610. At 610, method 600 includes aborting the ECT/TFT delta algorithm, and method 600 ends.

If at 602 it is determined that the engine is running, then method 600 proceeds to 606. At 606, method 600 includes calculating a no heat ratio (NO HR). The no heat ratio is the ratio of a time the engine is running below an engine speed threshold or engine load threshold to a total time engine has been running while method 600 is being performed. These thresholds may be calibratable. At 612, method 600 includes determining whether the NO HR is less than a NO HR threshold. If at 612 it is determined that the NO HR is not less than the NO HR threshold, method 600 proceeds to 618. Alternatively, if at 612 it is determined that the NO HR exceeds the NO HR threshold, method 600 proceeds to 614. At 614, method 600 includes incrementing a third timer. At 616, method 600 includes determining whether an output of the third timer exceeds a third threshold time. If at 616 it is determined that the output of the third timer exceeds the third threshold time, method 600 proceeds to 610, and the ECT/TFT delta algorithm is aborted. Alternatively, if at 616 it is determined that the output of the third timer does not exceed the third threshold time, method 600 proceeds to 618.

In other words, the NO HR is calculated while the algorithm is running, and a cumulative amount of time that the NO HR is less than the NO HR threshold is computed. If the cumulative amount of time that the NO HR is less than the NO HR threshold exceeds the third threshold time, the algorithm is not continued.

At 618, method 600 includes calculating a torque slip of the engine, based on the engine speed and a speed of a turbine of a torque converter of the vehicle (e.g., turbine shaft 158 of torque converter 157 of FIG. 1B). Specifically, the torque slip may be calculated based on equation 1 below:

$$\text{Torque slip} = ABS((\text{engine\_speed}(RPM) - \text{turbine\_speed}(RPM)) \quad 1$$

At 620, method 600 includes determining whether the torque slip exceeds a torque slip threshold. If at 620 it is determined that the torque slip does not exceed the torque slip threshold, method 600 proceeds to 626. Alternatively, if at 620 it is determined that the torque slip exceeds the torque slip threshold, method 600 proceeds to 622. At 622, method 600 includes incrementing a fourth timer. At 624, method 600 includes determining whether an output of the fourth timer is greater than a fourth threshold time. If at 624 it is determined that the output of the fourth timer is greater than the fourth threshold time, method 600 proceeds to 610, and the ECT/TFT delta algorithm is aborted. Alternatively, if at 624 it is determined that the output of the fourth timer does not exceed the fourth threshold time, method 600 proceeds to 626.

In other words, a cumulative amount of time that the torque slip is greater than the torque slip threshold is computed. If the cumulative amount of time that the torque slip is greater than the torque slip threshold exceeds the fourth threshold time, the algorithm is not continued.

At 626, method 600 includes determining whether the ATWU valve is in a closed position (e.g., commanded to the closed position and/or expected to be in the closed position). If at 626 the ATWU valve is in the closed position, method 600 proceeds to 632. Alternatively, if at 626 the ATWU valve is not in the closed position (e.g., the ATWU valve is open), method 600 proceeds to 628. At 628, method 600 includes incrementing a fifth timer. At 630, method 600 includes determining whether an output of the fifth timer exceeds a fifth threshold time. If at 630 it is determined that the output of the fifth timer exceeds the fifth threshold time, method 600 proceeds to 610, and the ECT/TFT delta algorithm is aborted. Alternatively, if at 630 it is determined that the output of the fifth timer does not exceed the fifth threshold time, method 600 proceeds to 632. In other words, a cumulative amount of time that the ATWU is open is computed. If the cumulative amount of time that the ATWU is open exceeds the fifth threshold time, the algorithm is not continued.

At 632, method 600 includes determining whether a temperature of an engine coolant (ECT) exceeds a functional threshold. The functional threshold is dictated by a controller (e.g., controller 12) and may be the temperature at which the ATWU is commanded to an open position (e.g., 70° C.). The ECT may be measured by an ECT sensor disposed on an engine coolant loop of the vehicle, such as ECT sensor 26 described above in relation to FIG. 1A. If at 632 it is determined that the ECT is less than the functional threshold, method 600 proceeds to 636.

At 636, method 600 includes determining whether a difference between the ECT and the TFT is greater than a predetermined temperature threshold. The TFT may be monitored by a TFT sensor (e.g. TFT sensor 27). If at 636 it is determined that a difference between the ECT and the TFT is not greater than the threshold value, method 600 proceeds back to 602. If at 636 it is determined that the difference between the ECT and the TFT is greater than the temperature threshold, method 600 proceeds to 638.

At 638, method 600 includes updating an area integral calculation. The area integral calculation is updated in a first step by subtracting the threshold value from the calculated difference between the ECT and the TFT, and multiplying the result by a time of a regular interval between each computation of method 600. In a second step, the area integral is then incremented by the result of the first step. After the area integral calculation is updated, method 600 proceeds back to 602.

In other words, the difference between the ECT and the TFT is determined at each iteration of the ECT/TFT delta algorithm (e.g., at regular intervals of time). A cumulative area integral between the ECT and the TFT may then be computed each regular interval (e.g., a second) whenever the difference between the ECT and the TFT is greater than the threshold. When the difference between the ECT and the TFT decreases below the threshold, the area integral is frozen, and the ECT/TFT delta algorithm continues. Thus, the area between the ECT and TFT curves above the temperature threshold may be computed, and the area between the ECT and TFT curves below the temperature threshold may not be computed. If any of the above conditions for aborting the ECT/TFT delta algorithm occur prior to ECT exceeding the functional threshold, the ECT/TFT delta algorithm is not continued.

Returning to 632, if at 632 it is determined that the ECT is not less than the functional threshold, method 600 proceeds to 634. At 634, method 600 includes determining whether the output of the third timer exceeds a sixth threshold time.

If at 634 it is determined that the output of the third timer exceeds the sixth threshold time, method 600 proceeds to 610, and the ECT/TFT delta algorithm is aborted. Alternatively, if at 634 it is determined that the output of the third timer does not exceed the sixth threshold time, method 600 proceeds to 640. In other words, if the total time the engine has been running since the start of new OBD trip with no abort conditions satisfied is less than a minimum amount of time, the ECT/TFT delta algorithm is aborted.

At 640, method 600 includes determining whether a result of dividing the area integral by a run time of the ECT/TFT delta algorithm is greater than a threshold value. The run time may be an amount of time passed since an initiation of the ECT/TFT delta algorithm at 602. By dividing the calculated area integral by the run time of the first algorithm, an average temperature difference between the ECT and the TFT is determined for a regular interval.

If at 640 it is determined that the result of dividing the area integral by the run time of the ECT/TFT delta algorithm is not greater than the threshold value (e.g., is less than or equal to the threshold value) method 600 proceeds to 642. At 642, method 600 includes indicating that the ECT/TFT delta algorithm does not pass, and method 600 ends. Alternatively, if at 640 it is determined that the result of dividing the area integral by the run time of the ECT/TFT delta algorithm is greater than the threshold value, method 600 proceeds to 644. At 644 method 600 includes indicating that the ECT/TFT delta algorithm passes, and method 600 ends. If the algorithm does not pass, the ATWU valve may be indicated as stuck in the open position.

Thus, the ECT/TFT delta algorithm includes a series of iterations that are performed over time, where during each iteration, a series of conditions for continuing the ECT/TFT delta algorithm are verified. The verification may involve comparing an output of one or more sensors and/or a result of a calculation to a predetermined threshold valve. If a condition for continuing is verified, the ECT/TFT delta algorithm proceeds to a subsequent condition. If a condition for continuing is not verified, a timer corresponding to the condition is incremented. During each subsequent iteration, an output of each timer may be compared with a corresponding timer threshold. Each timer may have a different threshold. If a timer threshold is exceeded, the ECT/TFT delta algorithm is aborted and does not complete. During each iteration, the ECT is compared with the TFT. If the ATWU valve is in an open or partially open position, heat may be transferred from the engine coolant to the transmission fluid, whereby a difference between the ECT and the TFT may be smaller. If the ATWU valve is in a closed position, heat may not be transferred from the engine coolant to the transmission fluid, whereby a difference between the ECT and the TFT may be greater. Thus, the area integral calculated between the ECT and the TFT may be used to indicate a stuck ATWU valve.

In an alternate scenario, method 600 may also be used to diagnose an ATWU valve stuck in a closed position, for example, when the ATWU valve is commanded to an open position to warm up the transmission fluid during a cold start. When method 600 is performed to diagnose the ATWU valve stuck in the closed position, steps 602-624 are the same as described above.

At 626, method 600 includes determining whether the ATWU valve is in an open position (e.g., commanded to the open position and/or expected to be in the open position). If at 626 the ATWU valve is in the open position, method 600 proceeds to 634. Alternatively, if at 626 the ATWU valve is not in the open position (e.g., the ATWU valve is open), method 600 proceeds to 628 and 630, as described above.

In the alternate scenario, step 632 is skipped, as the ATWU is already commanded open, and the method proceeds to 634. At 634, method 600 includes determining whether the ECT exceeds the operating temperature minus an offset threshold. The operating temperature is a temperature at which the coolant and transmission fluid would remain for a remainder of the drive cycle in the absence of any abnormal driving condition. If at 634 it is determined that the ECT exceeds the operating temperature minus the offset threshold, method 600 proceeds to 640. Alternatively, if at 634 it is determined that ECT does not exceed the operating temperature minus an offset threshold, method 600 proceeds to 636.

At 636 in the alternate scenario, method 600 includes determining whether a difference between the ECT and the TFT is greater than a second predetermined temperature threshold. If at 636 it is determined that a difference between the ECT and the TFT is not greater than the threshold value, method 600 proceeds back to 602. If at 636 it is determined that the difference between the ECT and the TFT is greater than the temperature threshold, method 600 proceeds to 638, and the area integral is updated as described above.

At 640 in the alternate scenario, method 600 includes determining whether a result of dividing the area integral by a run time of the ECT/TFT delta algorithm is less than a threshold value. If at 640 it is determined that the result of dividing the area integral by the run time of the ECT/TFT delta algorithm is not less than the threshold value (e.g., is greater than or equal to the threshold value) method 600 proceeds to 644. At 644, method 600 includes indicating that the ECT/TFT delta algorithm passes, and method 600 ends. Alternatively, if at 640 it is determined that the result of dividing the area integral by the run time of the ECT/TFT delta algorithm is less than the threshold value, method 600 proceeds to 642. At 642, method 600 includes indicating that the ECT/TFT delta algorithm does not pass, and method 600 ends. If the algorithm does not pass in the alternate scenario, the ATWU valve may be indicated as stuck in the closed position.

Figure 7A:
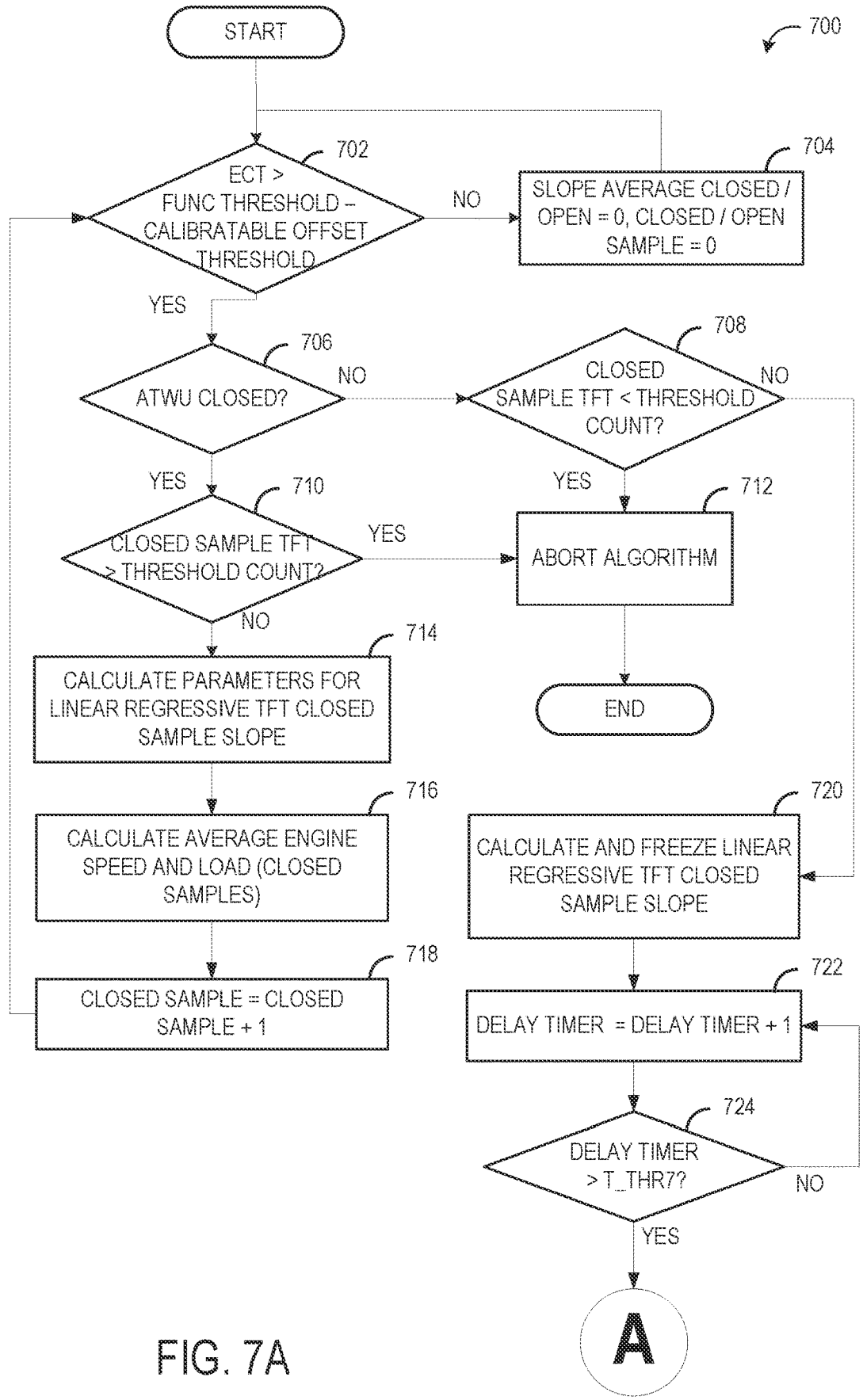
FIG. 7A shows a flowchart illustrating a first part of a second example method for determining whether the ATWU valve is stuck, as part of the monitoring routine of FIG. 2.
Figure 7B:
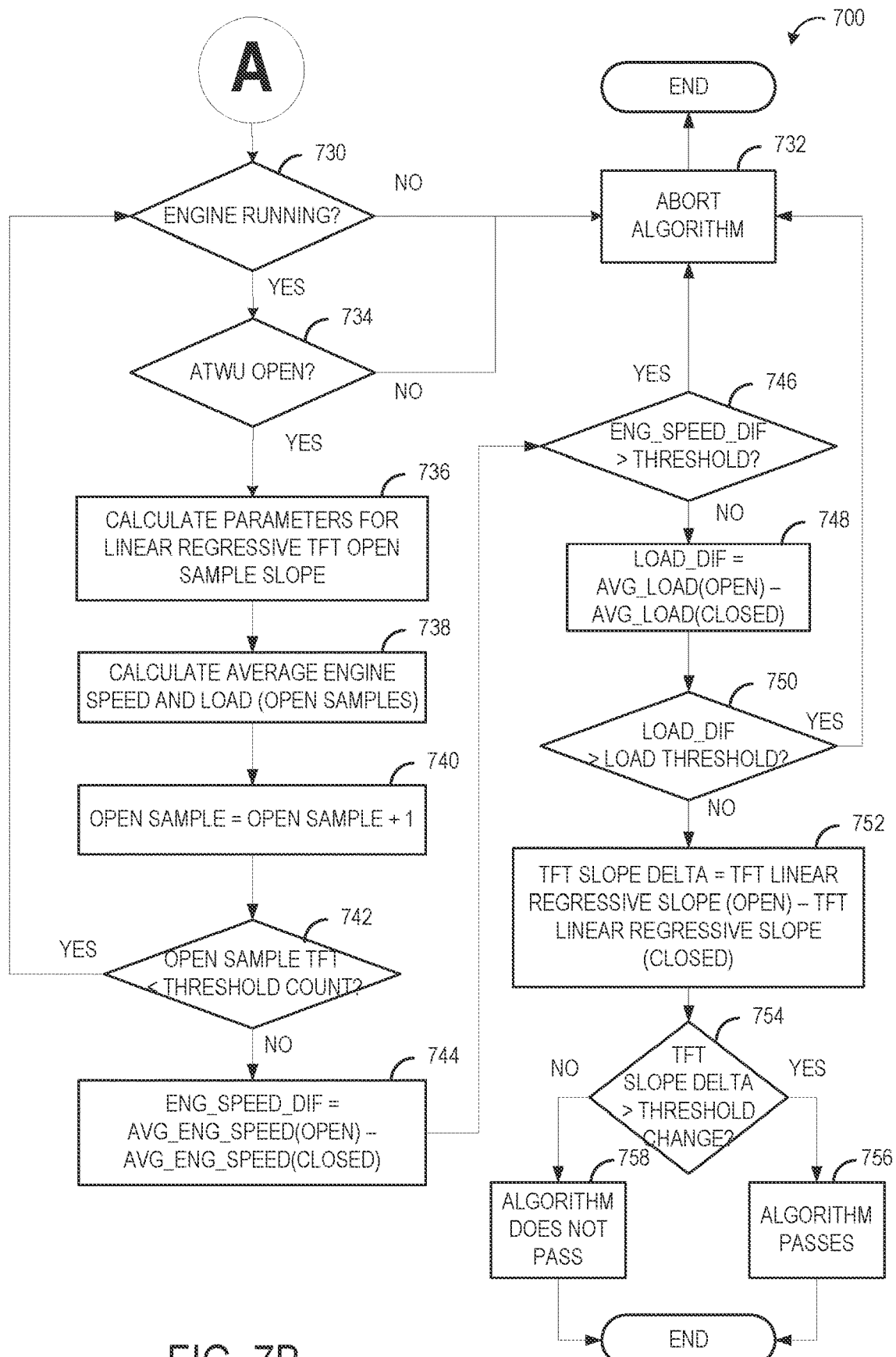
FIG. 7B shows a flowchart illustrating a second part of the second example method for determining whether the ATWU valve is stuck, as part of the monitoring routine of FIG. 2.
Figure 8B:
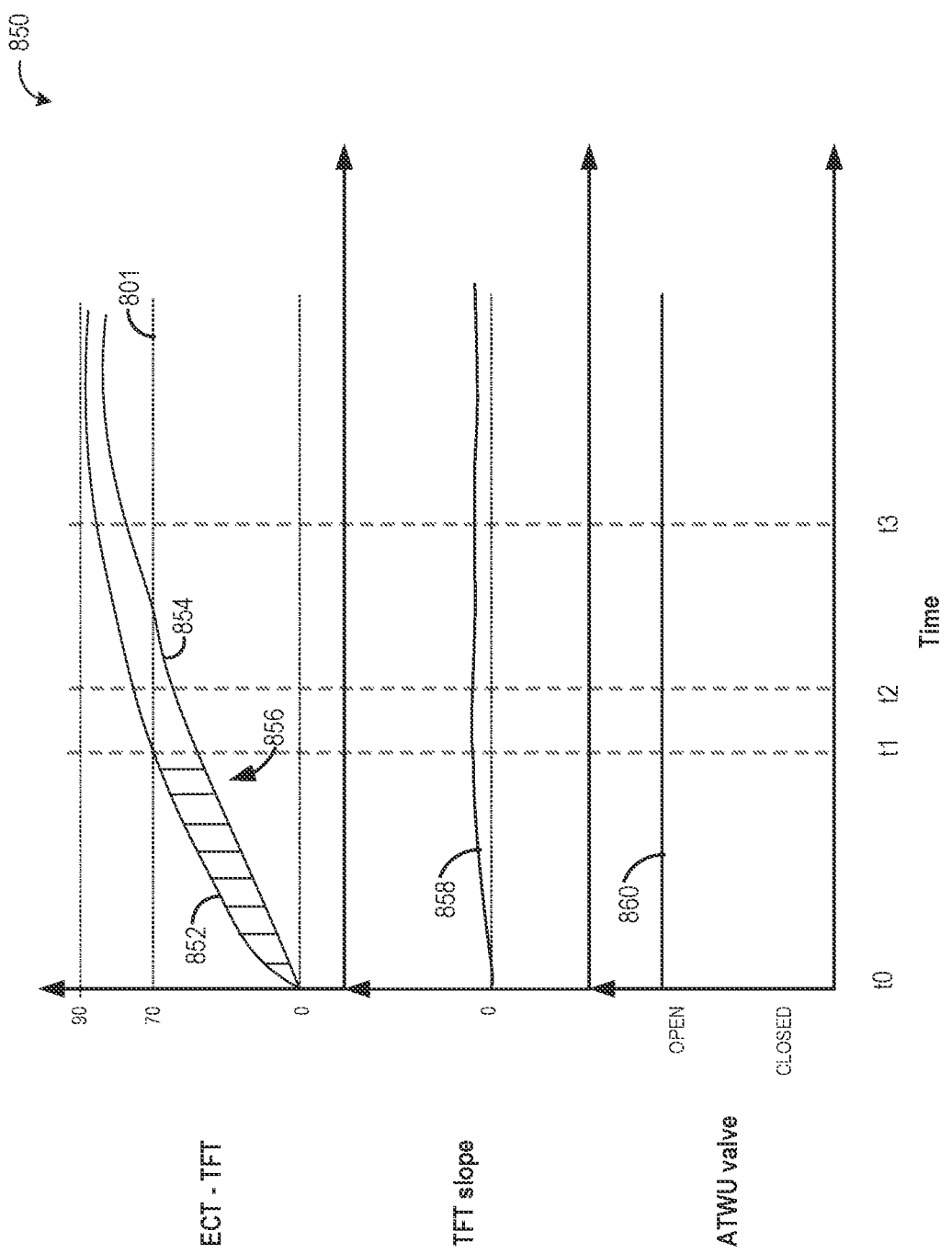
FIG. 8B shows a second example timeline for performing the monitoring routine of FIG. 2 during an engine startup event, where the ATWU valve is stuck in a closed position.

Referring now to FIG. 7A, a first part of an exemplary method 700 is shown for performing a second algorithm to diagnose a stuck ATWU valve of a vehicle, also as described above in reference to method 200 of FIG. 2. The second algorithm may be referred to as the TFT slope delta algorithm. A second part of method 700 is shown in FIG. 7B, described below. In various embodiments, method 700 may be performed as part of the monitoring routine of method 200 described above. For example, the monitoring routine of method 200 may determine whether the ATWU valve is stuck by comparing a result of method 700 with a result of method 600 of FIG. 6. In other embodiments, the monitoring routine of method 200 may determine whether the ATWU valve is stuck based on either a result of method 700 or a result of method 600 of FIG. 6. If either of the ECT/TFT delta algorithm or the TFT slope delta algorithm is aborted, or does not pass, the monitoring routine of method 200 may be aborted. Both methods 600 and 700 rely on measurements of an ECT of the vehicle, and a TFT of the vehicle. In particular, method 700 relies on comparing a first slope of the TFT for sample temperatures when the ATWU valve is closed (referred to herein as closed sample) with a second slope of the TFT for sample temperatures when the ATWU valve is open (referred to herein as open sample). As with method 600, method 700 may be performed over various iterations, where during each iteration, a TFT is measured and a slope (either from a closed sample or an open sample) is calculated using a linear regression method.

Method 700 is described herein as diagnosing the ATWU valve stuck in either a closed or an open position, for example, when the ATWU valve is commanded to the open position to warm up the transmission fluid during a cold start of an engine of the vehicle after ECT reaches the functional threshold. The ATWU valve may become stuck in the open position when the ATWU valve is commanded closed during the initial warm up of the engine.

Method 700 begins at 702, where method 700 includes determining whether the ECT is greater than a functional threshold minus a calibratable offset threshold. As described above in reference to method 600, the functional threshold is dictated by a controller (e.g., controller 12) and is the temperature at which the ATWU is commanded to an open position (e.g., 70° C.). For example, the ATWU may be closed at an engine start event (e.g., a cold start), and the ATWU valve may be opened when the engine coolant is warm enough to provide heat to a transmission of the vehicle (e.g., transmission 40). The ECT may be measured by an ECT sensor disposed on an engine coolant loop of the vehicle, such as ECT sensor 26 described above in relation to FIG. 1A. Method 700 is planned to start its closed slope calculation at a certain offset below the functional threshold. If at 702 it is determined that the ECT is not greater than the functional threshold minus the calibratable offset threshold, method 700 proceeds to 704.

At 704, method 700 includes resetting parameters for an average TFT slope to 0 for both open samples and closed samples (e.g., for conditions where the ATWU valve is open and closed, respectively). Method 700 proceeds back to 702.

If at 702 it is determined that the ECT is greater than the functional threshold minus the calibratable offset threshold, method 700 proceeds to 706. At 706, method 700 includes determining whether the ATWU valve is in a closed position. If at 706 it is determined that the ATWU valve is in the closed position, a closed sample TFT is collected, and method 700 proceeds to 710.

At 710, method 700 includes determining whether the closed sample TFT count is greater than a first threshold sample count. The TFT slope delta algorithm may rely on a minimum number of sample TFTs for a robust calculation of the TFT slope. If at 710 it is determined that the closed sample TFT count is greater than the first threshold sample count, method 700 proceeds to 712. At 712, method 700 includes aborting the TFT slope delta algorithm, and method 700 ends. Alternatively, if at 710 it is determined that the closed sample TFT count is not greater than the first threshold sample count (e.g., less than or equal to the first threshold sample count), method 700 proceeds to 714.

At 714, method 700 includes calculating parameters for a linear regressive TFT slope for the closed samples. In other words, an average rate of change of closed sample TFT measurements prior to commanding the ATWU valve open is calculated. The TFT slope may be calculated by performing a linear regression of the closed sample TFT measurements, in accordance with equation 2 described below:

$$b = \frac{n(\sum xy) - (\sum x)(\sum y)}{n(\sum x^2) - (\sum x)^2} \qquad 2$$

where b is the average rate of change of the TFT slope, x is a sample count, and y is a TFT measurement.

At 716, method 700 includes calculating an average engine speed and an average engine load for the closed sample TFT. The average engine speed and average engine load may be calculated over a period of time during which the closed sample TFTs are collected. The average engine speed and average engine load may be calculated with every iteration (e.g., for example, every second).

At 718, the closed sample TFT is incremented to obtain a new closed sample TFT, and method 700 proceeds back to 702.

In this way, during the time that the ATWU valve is closed, TFT samples are collected, and a slope of the TFT samples is calculated using a linear regression. When the ATWU valve is opened, the TFT slope for the closed samples is frozen for remaining steps of the TFT slope delta algorithm.

Returning to 706, if at 706 it is determined that the ATWU valve is not in the closed position (e.g., the ATWU valve is open), method 700 proceeds to 708. At 708, method 700 includes determining whether the closed sample TFT count is less than a second threshold sample count.

If at 708 it is determined that the closed sample TFT is less than the second threshold sample count, method 700 proceeds to 712. At 712 method 700 includes aborting the TFT slope delta algorithm, and method 700 ends.

Alternatively, if at 708 it is determined that the closed sample TFT is not less than the second threshold temperature (e.g., the closed sample TFT is greater than or equal to the second threshold temperature), method 700 proceeds to 720. At 720, method 700 includes performing a final calculation and freezing the linear regressive closed sample TFT slope (e.g., reflecting the rate of change of the slope), and method 700 proceeds to 722. At 722, method 700 includes incrementing a delay timer, and method 700 proceeds to 724.

At 724, method 700 includes determining whether an output of the delay timer is greater than a seventh threshold time. If at 724 it is determined that the output of the delay timer is not greater than the seventh threshold time, method 700 proceeds back to 722. Alternatively, if at 724 it is determined that the output of the delay timer is greater than the seventh threshold time, method 700 proceeds to 730 of FIG. 7B, where the TFT slope delta algorithm continues. The delay timer is employed to allow the heat transfer between ECT and transmission fluid within a heat exchanger, such as heat exchanger 180 in FIG. 1B, and subsequently transfer the heat to a conduit such as transmission coolant loop 165 in FIG. 1B as seen by TFT sensor.

At 730, method 700 includes determining whether the engine is running. If at 730 it is determined that the engine is not running, method 700 proceeds to 732. At 732, method 700 includes aborting the TFT slope delta algorithm, and method 700 ends. Alternatively, if at 730 it is determined that the engine is running, method 700 proceeds to 734.

At 734, method 700 includes determining whether the ATWU valve is in an open position (e.g., commanded to the open position and/or expected to be in the open position). For example, the ATWU valve may be commanded to the open position to direct engine coolant to a heat exchanger (e.g., heat exchanger 180 of FIG. 1B) where heat from the engine coolant may be transferred to transmission fluid circulating through a transmission of the vehicle.

If at 734 it is determined that the ATWU valve is not in the open position, method 700 proceeds to 732, and the TFT slope delta algorithm is aborted. If at 734 it is determined that the ATWU valve is in the open position, method 700 proceeds to 736.

At 736, method 700 includes calculating parameters for a linear regressive open sample TFT slope. An average rate of change of the TFT slope for the open samples (e.g., after the ATWU valve is commanded open) is calculated, by performing a linear regression of the open sample TFT measurements, in accordance with equation 2 described above in reference to step 714.

At 738, method 700 includes calculating an average engine speed and an average engine load for the open sample TFT.

At 740, the open sample TFT is incremented, to obtain a new open sample TFT, and method 700 proceeds to 742.

At 742, method 700 includes determining whether the number of open sample TFTs is less than a third threshold count. In some embodiments, the third threshold count may be equal to the the second threshold count described above in reference to step 708.

If at 742 it is determined that the number of open sample TFTs is less than the third threshold count, method 700 proceeds back to 730. Alternatively, if at 742 it is determined that the number of open sample TFTs is not less than the third threshold count (e.g., the number of open samples is greater than or equal to the third threshold count), method 700 proceeds to 744.

At 744, method 700 includes calculating a difference between a first average engine speed when the ATWU valve is open, and a second average engine speed when the ATWU valve is closed. In various environments, the average engine speed may be determined based on an output of an engine speed sensor of the vehicle. The first average engine speed may be determined over a duration during which the number of open sample TFTs were measured, and the second average engine speed may be determined over a duration during which the number of closed sample TFTs were measured. Method 700 proceeds to 746.

At 746, method 700 includes determining whether the difference between the first average engine speed when the ATWU valve is open and the second average engine speed when the ATWU valve is closed is greater than a threshold speed value. If at 746 it is determined that the difference exceeds the threshold speed value, method 700 proceeds to 732, and the TFT slope delta algorithm is aborted. Alternatively, if at 746 is determined that the difference does not exceed the threshold speed value, method 700 proceeds to 748.

At 748, method 700 includes calculating a difference between a first average engine load when the ATWU valve is open and a second average engine load when the ATWU valve is closed. The first average engine load may be determined over a duration during which the number of open sample TFTs were measured, and the second average engine load may be determined over a duration during which the number of closed sample TFTs were measured. Method 700 proceeds to 750.

At 750, method 700 includes determining whether the difference between the first average engine load when the ATWU valve is open and the second average engine load when the ATWU valve is commanded closed is greater than a threshold load value. If at 750 it is determined that the difference exceeds the threshold load value, method 700 proceeds to 732, and the TFT slope delta algorithm is aborted. Alternatively, if at 750 is determined that the difference does not exceed the threshold load value, method 700 proceeds to 752.

At 752, method 700 includes calculating a TFT slope delta, where the TFT slope delta is a difference between the average rate of change of the TFT for sample TFTs when the ATWU valve is open, and the average rate of change of the TFT for sample TFTs when the ATWU valve is closed. Specifically, the TFT slope delta is calculated as a difference between the TFT linear regressive slope for the open samples and the TFT linear regressive slope for the closed samples. Method 700 proceeds to 754.

At 754, method 700 includes determining whether the TFT slope delta is greater than a threshold value. If at 754 it is determined that the change in the TFT slope delta is greater than the threshold value, method 700 proceeds to 756. At 756, method 700 includes indicating that the TFT slope delta algorithm passes, and method 700 ends.

Alternatively, if at 754 it is determined that the TFT slope delta is not greater than the threshold change, method 700 proceeds to 758. At 758, method 700 includes indicating that the TFT slope delta algorithm does not pass, and method 700 ends.

Thus, in accordance with the TFT slope delta algorithm, a first slope of TFT measurements taken in a first condition in which the ATWU valve is closed is calculated, and a second slope of TFT measurements taken in a second condition in which the ATWU valve is open is calculated. If an engine speed or engine load difference between the open samples and the closed samples exceeds a threshold, the TFT slope delta algorithm is aborted. The first slope is compared with the second slope. If the difference between the first slope and the second slope is large (e.g., above a first threshold), it may be inferred that engine coolant is circulating through a transmission heat exchanger of the vehicle and heating the transmission fluid, whereby the ATWU valve is open (as expected). Alternatively, if the difference between the first slope and the second slope is small (e.g., below a second threshold), it may be inferred that the transmission fluid is not absorbing heat at an expected rate. Therefore, the engine coolant may not be circulating through the transmission heat exchanger, and it may be inferred that the ATWU valve is closed (not as expected). Under such conditions, the TFT slope delta algorithm does not pass, and a stuck ATWU valve may be indicated.

In an alternate scenario, method 700 may also be used to diagnose an ATWU valve stuck in an open position. When method 700 is performed to diagnose the ATWU valve stuck in the open position, the method may be the same as described above, since the method 700 uses a difference in rate of change of TFT before and after the valve changes state. The heat transfer to transmission will occur from the time the valve is stuck open, and there will be no change in the TFT slope before and after the ATWU valve is commanded open. The TFT slope delta is calculated as described above, and compared to a second threshold change, which may be different from the threshold change of the scenario described above. In the alternate scenario, if the TFT slope delta is less than the second threshold change, the algorithm may not pass, and if the TFT slope delta is greater than the second threshold change, the algorithm may pass. If the algorithm does not pass, the ATWU valve may be indicated as stuck in the open position.

Turning now to FIG. 8A, an example timing diagram 800 is shown for monitoring an ATWU valve of a cooling system of a vehicle, according to the method depicted in FIG. 2, and as applied to the system described herein and with reference to FIGS. 1A and 1B. Instructions for performing the actions described in timing diagram 800 may be executed by a controller (e.g., the controller 12 of FIG. 1A) based on instructions stored on a memory of the controller and in conjunction with signals received from sensors of the vehicle and cooling system, such as the sensors described above in relation to vehicle 102 of FIG. 1A.

Timing diagram 800 shows plots 802, 804, 808, and 810, which illustrate states of the ATWU valve and temperature measurements/calculations of engine coolant and transmission fluid with respect to time (horizontal axis), with time points of interest illustrated by vertical dashed lines. Plot 802 indicates an ECT of the vehicle, in accordance with a temperature range depicted on a y axis from 0° C. to 70° C. A dotted line 801 indicates a threshold temperature (70° C.) at which the ATWU valve may be actuated. Plot 804 indicates a TFT of the vehicle, in accordance with a temperature range depicted on a y axis from 0° C. to 70° C. Plot 808 indicates a rate of change (e.g., slope) of the TFT depicted in plot 804 for each TFT sample point, from a baseline of 0 indicated on the y axis. Plot 810 indicates a state of the ATWU valve, where the state may be OPEN or CLOSED.

At time t0, an engine of the vehicle is turned on in a cold start event, and a new OBD trip is initiated. An ATWU valve monitoring routine (e.g., method 200) is initiated, and various parameters used by the monitoring are initialized and/or reset. A precondition for starting the new OBD trip may be that a minimum duration has passed without the engine being on and/or the vehicle being operated. At time t0, the ECT and the TFT are both at an ambient temperature (e.g., close to 0° C.). The ATWU valve is in a closed position, where an engine coolant loop does not circulate coolant through a transmission of the vehicle.

Between time t0 and time t1, the engine coolant begins to circulate throughout the engine coolant loop, and the ECT increases as a result of heat generated by the engine, as shown by plot 802. The TFT increases at a slower rate than the ECT, as no heat from the engine coolant is transferred to the transmission fluid. Because of the slower rate of increase of the TFT with respect to the ECT, the difference between the ECT and the TFT increases. The slope of the TFT remains gradual, as shown by plot 808.

At time t1, the ECT reaches the threshold temperature indicated by line 801, and the ATWU valve is commanded to an open position, as indicated by plot 810. The normalized area integral of the difference between the ECT and the TFT may be used by a first algorithm of the ATWU monitoring routine (e.g., the ECT/TFT delta algorithm of FIG. 6) to determine whether the ATWU valve may be stuck. The ECT/TFT algorithm may determine that a cumulative difference between ECT and the TFT indicated by shaded area 806 (e.g., between time the closing of the ATWU valve at t0 and the opening of the ATWU valve at t1) is greater than a threshold difference, from which it may be inferred that the ATWU valve was not stuck in open position between t0 and t1 position, whereby an ECT/TFT delta algorithm may pass.

Between time t1 and time t2, heated engine coolant begins to circulate through the ATWU valve to a transmission heat exchanger (e.g. heat exchanger 180 of FIG. 1B), and heat from the engine coolant begins to be transferred to the transmission fluid, thereby increasing the TFT. The rate of increase of the TFT may be rapid, as indicated by the increase in the TFT slope shown by plot 808. As the TFT increases, the difference between the ECT and the TFT decreases.

At time t2, the TFT approaches the ECT. Specifically, the decrease in the difference between the ECT and the TFT between time t1 and time t2 may be an indication that heat is being exchanged between the engine coolant and the transmission fluid as expected, from which it may be inferred that the ATWU valve is in the open position. The slope of the TFT is close to maximum as the TFT reaches a maximum temperature.

Between time t2 and time t3, the rise in ECT temperature may be similar to TFT, as both rise close to their operating temperatures. The operating temperature is the temperature at which the coolant and transmission fluid would remain for a remainder of the drive cycle in the absence of any abnormal driving condition. The difference between ECT and the TFT decreases towards zero.

A difference in the TFT slope between conditions in which the ATWU valve is open and the ATWU valve is closed (at a calibratable time before and after t1) may be used by a second algorithm of the ATWU monitoring routine (e.g., the TFT slope delta algorithm of FIGS. 7A and 7B) to determine whether the ATWU valve may be stuck. The TFT slope delta algorithm may compare a first TFT slope just prior to t1 with a second TFT slope just after t1. If the second slope is greater than the first slope by a threshold amount, it may be inferred that the ATWU valve is in the open position (e.g., not stuck in the closed position), and the TFT slope delta algorithm may pass.

At time t3, the ECT reaches a target temperature close to operating temperature as described above. As a result of either or both of the TFT slope delta algorithm and the ECT/TFT delta algorithm passing, the ATWU monitoring routine may indicate that the ATWU valve is open.

In contrast, FIG. 8B shows an example timing diagram 850 for monitoring the ATWU valve according to the method depicted in FIG. 2, where the ATWU valve becomes stuck. Timing diagram 850 includes plots 852, 854, 858, and 860, which illustrate states of the ATWU valve and temperature measurements/calculations of engine coolant and transmission fluid with respect to time (horizontal axis), similar to plots 802, 804, 808, and 810 of FIG. 8A. Plot 852 indicates an ECT of the vehicle, in accordance with a temperature range depicted on a y axis from 0° C. to 70° C. Dotted line 801 indicates a threshold temperature (70° C.) at which the ATWU valve may be actuated. Plot 854 indicates a TFT of the vehicle, in accordance with a temperature range depicted on a y axis from 0° C. to 70° C. Plot 858 indicates a rate of change (e.g., slope) of the TFT depicted in plot 854 for each TFT sample point, from a baseline of 0 indicated on the y axis. Plot 860 indicates a state of the ATWU valve, where the state may be OPEN or CLOSED.

At time t0, the engine is turned on in a cold start event, and a new OBD trip is initiated. The ATWU valve monitoring routine (e.g., method 200) is initiated, and various parameters used by the monitoring are initialized and/or reset. At time t0, the ECT and the TFT are both at an ambient temperature (e.g., close to 0° C.). The ATWU valve is expected to be in a closed position, where an engine coolant loop does not circulate coolant through a transmission of the vehicle, but is stuck in the open position.

Between time t0 and time t1, the engine coolant begins to circulate throughout the engine coolant loop, and the ECT increases as a result of heat generated by the engine, as shown by plot 852. The TFT increases at a rate closer to the ECT, as heat from the engine coolant is transferred to the transmission fluid. Because of the similar rate of increase of the TFT with respect to the ECT, the difference between the ECT and the TFT remains relatively constant. The slope of the TFT remains gradual (as there is no large difference between the ECT and TFT temperature from the engine start), as shown by plot 858.

As in timing diagram 800 of FIG. 8A, at time t1, the ECT reaches the threshold temperature indicated by line 801, and the ATWU valve is commanded to an open position, as indicated by plot 860. However, in FIG. 8B, the ATWU valve is stuck in the open position, as shown by plot 860. The normalized area integral of the difference between the ECT and the TFT may be used by a first algorithm of the ATWU monitoring routine (e.g., the ECT/TFT delta algorithm of FIG. 6) to determine whether the ATWU valve may be stuck. Since the ECT and TFT rise at relatively the same rate, the normalized area integral between the ECT and TFT is small. The ECT/TFT delta algorithm may determine that a cumulative difference between ECT and the TFT indicated by shaded area 856, between a time the closing of the ATWU valve at t0 and the opening of the ATWU valve at t1, does not exceed a threshold difference, from which it may be inferred that ATWU valve was stuck in open position between t0 and t1 position, whereby an ECT/TFT delta algorithm may not pass.

As such, between time t1 and time t2, in contrast to FIG. 8A, there is no large difference between ECT and TFT (as the ATWU valve is open from engine start) and no additional heat from the engine coolant is transferred to the transmission fluid. Thus, the TFT increases gradually in plot 854, as indicated by the slow increase in the TFT slope shown by plot 858.

At time t2, the slope of the TFT reaches remains relatively constant as there is no sudden heat transfer from the ECT.

A difference in the TFT slope between conditions in which the ATWU valve is closed and the ATWU valve is opened may be used by a second algorithm of the ATWU monitoring routine (e.g., the TFT slope delta algorithm of FIGS. 7A and 7B) to determine whether the ATWU valve may be stuck. The TFT slope delta algorithm may compare a first TFT slope just prior to t1 with a second TFT slope just after t1. As shown by plot 858, the difference between the first slope and the second slope is small (e.g., less than a threshold amount), whereby may be inferred that the ATWU valve is not in the closed position (e.g., stuck in the open position), and the TFT slope delta algorithm may not pass.

Between time t2 and time t3, the slope of the ECT and TFT may decrease as heat is transferred from the engine coolant to the radiator. The difference between ECT and the TFT decreases towards zero, and the TFT slope decreases towards zero.

At time t3, the ECT reaches a target temperature close to operating temperature, as described above in reference to FIG. 8A. As a result of either or both of the TFT slope delta algorithm and the ECT/TFT delta algorithm not passing, the ATWU monitoring routine may indicate that the ATWU valve is stuck in the open position.

Thus, a robust ATWU valve monitoring routine is described, based on two algorithms. The two algorithms include an ECT/TFT delta algorithm, which measures a normalized difference in temperature between the ECT and the TFT when the ATWU valve is closed, and a TFT slope delta algorithm, which compares a first rate of change of TFT measurements prior to commanding the ATWU valve open with a second rate of change of TFT measurements after commanding the ATWU valve open. A stuck ATWU valve may be indicated by either of the two algorithms, or by comparing results of the two algorithms. In this way, a stuck ATWU valve may be more rapidly and accurately diagnosed than by other diagnostic methods, or by a single diagnostic method. As a result of relying on two different algorithms, the stuck ATWU valve may be diagnosed even if a result cannot be generated by one of the algorithms. The technical effect of using the robust ATWU valve monitoring routine including the two algorithms is that a more robust diagnosis of a stuck ATWU valve may be made.

The disclosure also provides support for a method for an active Transmission Warmup (ATWU) valve monitoring routine of a vehicle, the method comprising: determining a temperature difference between an engine coolant temperature (ECT) and a transmission fluid temperature (TFT) over a duration before the ATWU valve is commanded from a closed position to an open position or from the open position to the closed position, comparing a rate of change of the TFT before and after the ATWU valve is commanded to the open position or the closed position, and indicating a stuck ATWU valve based on at least one of the temperature difference, the TFT rate of change comparison, or a combination thereof, based on a calibration parameter. In a first example of the method, the ATWU valve monitoring routine is performed during an engine cold start. In a second example of the method, optionally including the first example, the method further comprises: initiating the ATWU valve monitoring routine in response to all of: a measured ambient air temperature (AAT) being below a threshold AAT temperature, the ECT being greater than a threshold ECT temperature, a soak time of the vehicle being greater than or equal to a threshold soak time, and a time during which an engine of the vehicle is on being greater than a first threshold time. In a third example of the method, optionally including one or both of the first and second examples, the method further comprises: indicating the stuck ATWU valve based on both of the temperature difference and the TFT rate of change comparison. In a fourth example of the method, optionally including one or more or each of the first through third examples, the method further comprises: indicating the stuck ATWU valve based on one of the temperature difference and the TFT rate of change comparison. In a fifth example of the method, optionally including one or more or each of the first through fourth examples, indicating the stuck ATWU valve based on the temperature difference between the ECT and the TFT over the duration before the ATWU valve is commanded from the closed position to the open position further comprises: calculating a difference between the ECT and the TFT at a plurality of regular intervals, at each regular interval of the plurality of regular intervals: in response to the temperature difference being greater than a threshold temperature difference, updating a cumulative calculated area integral between the ECT and the TFT, and in response to the temperature difference decreasing below the threshold temperature difference: dividing the calculated area integral by a time elapsed since the ATWU valve is commanded closed to determine an average temperature difference between the ECT and the TFT for a regular interval, in response to the average temperature difference being greater than a threshold average temperature difference, not indicating the stuck ATWU valve, and in response to the average temperature difference not being greater than the threshold average temperature difference, indicating that the ATWU valve is stuck in the open position. In a sixth example of the method, optionally including one or more or each of the first through fifth examples, indicating the stuck ATWU valve based on the temperature difference between the ECT and the TFT over the duration before the ATWU valve is commanded from the open position to the closed position further comprises: calculating a difference between the ECT and the TFT at a plurality of regular intervals, at each regular interval of the plurality of regular intervals: in response to the temperature difference being greater than a threshold temperature difference, updating a cumulative calculated area integral between the ECT and the TFT, and in response to the temperature difference decreasing below the threshold temperature difference: dividing the calculated area integral by a time elapsed since the ATWU valve is commanded open to determine an average temperature difference between the ECT and the TFT for a regular interval, in response to the average temperature difference being less than a threshold average temperature difference, not indicating the stuck ATWU valve, and in response to the average temperature difference not being less than the threshold average temperature difference, indicating that the ATWU valve is stuck in the closed position. In a seventh example of the method, optionally including one or more or each of the first through sixth examples, indicating the stuck ATWU valve based on comparing the rate of change of the TFT before and after the ATWU valve is commanded from the closed position to the open position further comprises: collecting a first minimum number of sample TFT measurements at regular intervals prior to opening the ATWU valve, performing a first linear regression to calculate a first TFT slope of the first minimum number of sample TFT measurements, collecting a second minimum number of sample TFT measurements at regular intervals after opening the ATWU valve, performing a second linear regression to calculate a second TFT slope of the second minimum number of sample TFT measurements, calculating a difference between the first TFT slope and the second TFT slope, in response to the difference being greater than a threshold difference, not indicating the stuck ATWU valve, and in response to the difference not being greater than the threshold difference, indicating that the ATWU valve is stuck in the closed position. In a eighth example of the method, optionally including one or more or each of the first through seventh examples, the method further comprises: in response to the stuck ATWU valve being indicated, limiting an acceleration of the vehicle. In a ninth example of the method, optionally including one or more or each of the first through eighth examples, the method further comprises: aborting the ATWU valve monitoring routine in response to at least one of the following: an error being detected in a TFT sensor of the vehicle, an error being detected in an ECT sensor of the vehicle, an error being detected in an AAT sensor of the vehicle, an error being detected in an engine speed sensor of the vehicle, an error being detected in an engine load sensor of the vehicle, and an error being detected in an ATWU circuit of the vehicle.

The disclosure also provides support for a system for a vehicle, comprising: a coolant system configured to circulate coolant through at least an engine, a radiator, a heater core, a controller, storing instructions in non-transitory memory that, when executed, cause the controller to: during a cold start of the engine, perform a monitoring routine that monitors a status of an active Transmission Warmup (ATWU) valve of the coolant system that when commanded open, allows the coolant to circulate through a transmission heat exchanger of the vehicle, the monitoring routine comprising: determining a temperature difference between an engine coolant temperature (ECT) and a transmission fluid temperature (TFT) over a duration before the ATWU valve is commanded from an open position to a closed position or from the closed position to the open position, comparing a rate of change of the TFT before and after the ATWU valve is commanded from the open position to the closed position or from the closed position to the open position, indicating a stuck ATWU valve based on at least one of the temperature difference, the TFT rate of change comparison, or a combination thereof, based on a calibration parameter. In a first example of the system, further instructions are stored in the non-transitory memory that when executed, cause the controller to indicate a stuck ATWU valve based on one of the temperature difference and the TFT rate of change comparison. In a second example of the system, optionally including the first example, further instructions are stored in the non-transitory memory that when executed, cause the controller to indicate a stuck ATWU valve based on both of the temperature difference and the TFT rate of change comparison. In a third example of the system, optionally including one or both of the first and second examples, the monitoring routine is initiated in response to all of: a measured ambient air temperature (AAT) being below a threshold AAT temperature, the ECT being greater than a threshold ECT temperature, a soak time of the vehicle being greater than or equal to a threshold soak time, and a time during which the engine is on being greater than a threshold time. In a fourth example of the system, optionally including one or more or each of the first through third examples, indicating the stuck ATWU valve based on the temperature difference between the ECT and the TFT over the duration before the ATWU valve is commanded from the closed position to the open position further comprises: calculating a difference between the ECT and the TFT at a plurality of regular intervals, at each regular interval of the plurality of regular intervals: in response to the difference being less than a threshold temperature difference, updating a cumulative calculated area integral between the ECT and the TFT, and in response to the difference increasing above the threshold temperature difference: dividing the calculated area integral by a time elapsed since the ATWU valve is commanded open to determine an average temperature difference between the ECT and the TFT for a regular interval, in response to the average temperature difference being less than a threshold average temperature difference, not indicating that the ATWU valve is stuck in the closed position, and in response to the average temperature difference not being greater than the threshold average temperature difference, indicating that the ATWU valve is stuck in the closed position. In a fifth example of the system, optionally including one or more or each of the first through fourth examples, indicating that the ATWU valve is stuck in the closed position based on comparing the rate of change of the TFT before and after the ATWU valve is commanded open further comprises: collecting a first minimum number of sample TFT values at regular intervals prior to opening the ATWU valve, performing a first linear regression to calculate a first TFT slope of the first minimum number of sample TFT values, collecting a second minimum number of sample TFT values at regular intervals after opening the ATWU valve, performing a second linear regression to calculate a second TFT slope of the second minimum number of sample TFT values, calculating a difference between the first TFT slope and the second TFT slope, in response to the difference being greater than a threshold difference, not indicating that the ATWU valve is stuck in the closed position, and in response to the difference not being greater than the threshold difference, indicating that the ATWU valve is stuck in the closed position. In a sixth example of the system, optionally including one or more or each of the first through fifth examples, further instructions are stored in the non-transitory memory that when executed, cause the controller to limit an acceleration of the vehicle in response to the stuck ATWU valve being indicated.

The disclosure also provides support for a method for a controller of a vehicle including an active Transmission Warmup (ATWU) valve, the method comprising: based on a calibration parameter being equal to a first value, determining whether the ATWU valve is stuck based on calculating an area integral between a first curve defined by an engine coolant temperature (ECT) and a second curve defined by a transmission fluid temperature (TFT) over a duration before the ATWU valve is commanded open, based on the calibration parameter being equal to a second value, determining whether the ATWU valve is stuck based on calculating a first slope of a first curve defined by TFT measurements taken prior to commanding the ATWU valve open, calculating a second slope of a second curve defined by TFT measurements taken after commanding the ATWU valve open, and comparing the first slope to the second slope, based on the calibration parameter being equal to a third value, determining whether the ATWU valve is stuck based on both calculating the area integral and comparing the first slope to the second slope, in response to at least one of the area integral being less than a first threshold value and a difference between the second slope and the first slope being less than a second threshold value, setting a diagnostic flag, and in response to the diagnostic flag being set, indicating that the ATWU valve is stuck. In a first example of the method, the calibration parameter is equal to the third value, and: in a first condition where the ATWU valve is stuck, the area integral is less than the first threshold value and the difference between the second slope and the first slope is less than the second threshold value, and the diagnostic flag is set, and in a second condition where the ATWU valve is not stuck, the area integral is not less than the first threshold value and the difference between the second slope and the first slope is not less than the second threshold value, and the diagnostic flag is not set. In a second example of the method, optionally including the first example, the calibration parameter is equal to the third value, and: in the first condition where the ATWU valve is stuck, the area integral is less than the first threshold value and the difference between the second slope and the first slope is not less than the second threshold value, and the diagnostic flag is set.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an Active Transmission Warmup (ATWU) valve monitoring routine of a vehicle, the method comprising:
    determining a temperature difference between an engine coolant temperature (ECT) and a transmission fluid temperature (TFT) over a duration before the ATWU valve is commanded from a closed position to an open position or from the open position to the closed position;
    comparing a rate of change of the TFT before and after the ATWU valve is commanded to the open position or the closed position;
    indicating a stuck ATWU valve based on at least one of the temperature difference, the TFT rate of change comparison, or a combination thereof, based on a calibration parameter; and
    in response to the stuck ATWU valve being indicated, limiting an acceleration of the vehicle.

2. The method of claim 1, wherein the ATWU valve monitoring routine is performed during an engine cold start.

3. The method of claim 2, further comprising initiating the ATWU valve monitoring routine in response to all of:
    a measured ambient air temperature (AAT) being below a threshold AAT temperature;
    the ECT being greater than a threshold ECT temperature;
    a soak time of the vehicle being greater than or equal to a threshold soak time; and
    a time during which an engine of the vehicle is on being greater than a first threshold time.

4. The method of claim 1, further comprising indicating the stuck ATWU valve based on both of the temperature difference and the TFT rate of change comparison.

5. The method of claim 1, further comprising indicating the stuck ATWU valve based on one of the temperature difference and the TFT rate of change comparison.

6. The method of claim 1, wherein indicating the stuck ATWU valve based on the temperature difference between the ECT and the TFT over the duration before the ATWU valve is commanded from the closed position to the open position further comprises:
    calculating a difference between the ECT and the TFT at a plurality of regular intervals;
    at each regular interval of the plurality of regular intervals:

in response to the temperature difference being greater than a threshold temperature difference, updating a cumulative calculated area integral between the ECT and the TFT; and in response to the temperature difference decreasing below the threshold temperature difference:
dividing the calculated area integral by a time elapsed since the ATWU valve is commanded closed to determine an average temperature difference between the ECT and the TFT for a regular interval;
in response to the average temperature difference being greater than a threshold average temperature difference, not indicating the stuck ATWU valve; and
in response to the average temperature difference not being greater than the threshold average temperature difference, indicating that the ATWU valve is stuck in the open position.

7. The method of claim 1, wherein indicating the stuck ATWU valve based on the temperature difference between the ECT and the TFT over the duration before the ATWU valve is commanded from the open position to the closed position further comprises:
calculating a difference between the ECT and the TFT at a plurality of regular intervals;
at each regular interval of the plurality of regular intervals:
in response to the temperature difference being greater than a threshold temperature difference, updating a cumulative calculated area integral between the ECT and the TFT; and
in response to the temperature difference decreasing below the threshold temperature difference:
dividing the calculated area integral by a time elapsed since the ATWU valve is commanded open to determine an average temperature difference between the ECT and the TFT for a regular interval;
in response to the average temperature difference being less than a threshold average temperature difference, not indicating the stuck ATWU valve; and
in response to the average temperature difference not being less than the threshold average temperature difference, indicating that the ATWU valve is stuck in the closed position.

8. The method of claim 1, wherein indicating the stuck ATWU valve based on comparing the rate of change of the TFT before and after the ATWU valve is commanded from the closed position to the open position further comprises:
collecting a first minimum number of sample TFT measurements at regular intervals prior to opening the ATWU valve;
performing a first linear regression to calculate a first TFT slope of the first minimum number of sample TFT measurements;
collecting a second minimum number of sample TFT measurements at regular intervals after opening the ATWU valve;
performing a second linear regression to calculate a second TFT slope of the second minimum number of sample TFT measurements;
calculating a difference between the first TFT slope and the second TFT slope;
in response to the difference being greater than a threshold difference, not indicating the stuck ATWU valve; and in response to the difference not being greater than the threshold difference, indicating that the ATWU valve is stuck in the closed position.

9. The method of claim 1, further comprising aborting the ATWU valve monitoring routine in response to at least one of the following:
an error being detected in a TFT sensor of the vehicle;
an error being detected in an ECT sensor of the vehicle;
an error being detected in an AAT sensor of the vehicle;
an error being detected in an engine speed sensor of the vehicle;
an error being detected in an engine load sensor of the vehicle; and
an error being detected in an ATWU circuit of the vehicle.

10. A system for a vehicle, comprising:
a coolant system configured to circulate coolant through at least an engine, a radiator, a heater core;
a controller, storing instructions in non-transitory memory that, when executed, cause the controller to:
during a cold start of the engine, perform a monitoring routine that monitors a status of an Active Transmission Warmup (ATWU) valve of the coolant system that when commanded open, allows the coolant to circulate through a transmission heat exchanger of the vehicle, the monitoring routine comprising:
determining a temperature difference between an engine coolant temperature (ECT) and a transmission fluid temperature (TFT) over a duration before the ATWU valve is commanded from an open position to a closed position or from the closed position to the open position;
comparing a rate of change of the TFT before and after the ATWU valve is commanded from the open position to the closed position or from the closed position to the open position;
indicating a stuck ATWU valve based on at least one of the temperature difference, the TFT rate of change comparison, or a combination thereof, based on a calibration parameter; and
limit an acceleration of the vehicle in response to the stuck ATWU valve being indicated.

11. The system of claim 10, where further instructions are stored in the non-transitory memory that when executed, cause the controller to indicate a stuck ATWU valve based on one of the temperature difference and the TFT rate of change comparison.

12. The system of claim 10, where further instructions are stored in the non-transitory memory that when executed, cause the controller to indicate a stuck ATWU valve based on both of the temperature difference and the TFT rate of change comparison.

13. The system of claim 10, wherein the monitoring routine is initiated in response to all of:
a measured ambient air temperature (AAT) being below a threshold AAT temperature;
the ECT being greater than a threshold ECT temperature;
a soak time of the vehicle being greater than or equal to a threshold soak time; and
a time during which the engine is on being greater than a threshold time.

14. The system of claim 10, wherein indicating the stuck ATWU valve based on the temperature difference between the ECT and the TFT over the duration before the ATWU valve is commanded from the closed position to the open position further comprises:
calculating a difference between the ECT and the TFT at a plurality of regular intervals;

at each regular interval of the plurality of regular intervals:
  in response to the difference being less than a threshold temperature difference, updating a cumulative calculated area integral between the ECT and the TFT; and
  in response to the difference increasing above the threshold temperature difference:
    dividing the calculated area integral by a time elapsed since the ATWU valve is commanded open to determine an average temperature difference between the ECT and the TFT for a regular interval;
    in response to the average temperature difference being less than a threshold average temperature difference, not indicating that the ATWU valve is stuck in the closed position; and
    in response to the average temperature difference not being greater than the threshold average temperature difference, indicating that the ATWU valve is stuck in the closed position.

15. The system of claim 10, wherein indicating that the ATWU valve is stuck in the closed position based on comparing the rate of change of the TFT before and after the ATWU valve is commanded open further comprises:
  collecting a first minimum number of sample TFT values at regular intervals prior to opening the ATWU valve;
  performing a first linear regression to calculate a first TFT slope of the first minimum number of sample TFT values;
  collecting a second minimum number of sample TFT values at regular intervals after opening the ATWU valve;
  performing a second linear regression to calculate a second TFT slope of the second minimum number of sample TFT values;
  calculating a difference between the first TFT slope and the second TFT slope;
  in response to the difference being greater than a threshold difference, not indicating that the ATWU valve is stuck in the closed position; and
  in response to the difference not being greater than the threshold difference, indicating that the ATWU valve is stuck in the closed position.

16. A method for a controller of a vehicle including an Active Transmission Warmup (ATWU) valve, the method comprising:
  based on a calibration parameter being equal to a first value, determining whether the ATWU valve is stuck based on calculating an area integral between a first curve defined by an engine coolant temperature (ECT) and a second curve defined by a transmission fluid temperature (TFT) over a duration before the ATWU valve is commanded open;
  based on the calibration parameter being equal to a second value, determining whether the ATWU valve is stuck based on calculating a first slope of a first curve defined by TFT measurements taken prior to commanding the ATWU valve open, calculating a second slope of a second curve defined by TFT measurements taken after commanding the ATWU valve open, and comparing the first slope to the second slope;
  based on the calibration parameter being equal to a third value, determining whether the ATWU valve is stuck based on both calculating the area integral and comparing the first slope to the second slope;
  in response to at least one of the area integral being less than a first threshold value and a difference between the second slope and the first slope being less than a second threshold value, setting a diagnostic flag; and
  in response to the diagnostic flag being set, indicating that the ATWU valve is stuck.

17. The method of claim 16, wherein the calibration parameter is equal to the third value, and:
  in a first condition where the ATWU valve is stuck, the area integral is less than the first threshold value and the difference between the second slope and the first slope is less than the second threshold value, and the diagnostic flag is set; and
  in a second condition where the ATWU valve is not stuck, the area integral is not less than the first threshold value and the difference between the second slope and the first slope is not less than the second threshold value, and the diagnostic flag is not set.

18. The method of claim 17, wherein the calibration parameter is equal to the third value, and:
  in the first condition where the ATWU valve is stuck, the area integral is less than the first threshold value and the difference between the second slope and the first slope is not less than the second threshold value, and the diagnostic flag is set.

* * * * *